(12) United States Patent
Johnson et al.

(10) Patent No.: US 12,034,582 B2
(45) Date of Patent: Jul. 9, 2024

(54) ADAPTIVE RADIO FREQUENCY COMMUNICATION

(71) Applicant: Peraton Labs Inc., Basking Ridge, NJ (US)

(72) Inventors: William Johnson, Basking Ridge, NJ (US); Kiran Rege, Basking Ridge, NJ (US); Achilles Kogiantis, Basking Ridge, NJ (US)

(73) Assignee: Peraton Labs Inc., Basking Ridge, NJ (US)

( * ) Notice: Subject to any disclaimer, the term of this patent is extended or adjusted under 35 U.S.C. 154(b) by 0 days.

(21) Appl. No.: 17/249,590

(22) Filed: Mar. 5, 2021

(65) Prior Publication Data
US 2022/0286342 A1     Sep. 8, 2022

(51) Int. Cl.
H04L 27/26      (2006.01)
H04B 7/08       (2006.01)
H04W 48/16      (2009.01)

(52) U.S. Cl.
CPC ......... *H04L 27/2657* (2013.01); *H04B 7/088* (2013.01); *H04W 48/16* (2013.01)

(58) Field of Classification Search
CPC ...... H04B 7/01; H04B 7/0408; H04B 17/336; H04L 27/26; H04W 56/0035; H04W 72/042; H04W 24/10; H04W 84/005; H04W 4/02; H04W 4/029; H04W 36/32
See application file for complete search history.

(56) References Cited

U.S. PATENT DOCUMENTS

| | | |
|---|---|---|
| 5,303,240 A | 4/1994 | Borras et al. |
| 5,844,522 A | 12/1998 | Sheffer et al. |
| 6,339,697 B1 | 1/2002 | Ranta |
| 6,377,802 B1 | 4/2002 | McKenna et al. |
| 6,768,913 B1 | 7/2004 | Molnar et al. |
| 6,963,745 B2 | 11/2005 | Singh et al. |
| 7,058,401 B1 | 6/2006 | Sinivaara et al. |
| 7,610,025 B2 | 10/2009 | Fernandez-Corbaton et al. |
| 8,254,913 B2 | 8/2012 | Alcom |
| 8,503,328 B2 | 8/2013 | Tian et al. |
| 8,688,108 B2 | 4/2014 | Kaminski et al. |

(Continued)

OTHER PUBLICATIONS

Response to Ex Parte Quayle action; U.S. Appl. No. 17/249,591, filed Sep. 7, 2022; 8 pages.

*Primary Examiner* — Romani Ohri
(74) *Attorney, Agent, or Firm* — George Blasiak; Heslin Rothenberg, Farley & Mesiti

(57) ABSTRACT

There is set forth herein, in one embodiment, receiving, by a transceiver of a UE device an aggregate signal stream, the aggregate signal stream including an aggregate of base station downlink signal streams from a plurality of base stations; processing the aggregate signal stream and detecting, from the processing of the aggregate signal stream, a set of base stations in communication range of the UE device, wherein the set of base stations include a current serving base station and a scanning base station; determining, from the processing of the aggregate signal stream, a Doppler shifted center frequency of a downlink scanning signal stream received from the scanning base station; and enhancing, in dependence on the Doppler shifted center frequency, the downlink scanning signal stream associated to the scanning base station.

20 Claims, 14 Drawing Sheets

(56) References Cited

U.S. PATENT DOCUMENTS

| | | |
|---|---|---|
| 8,843,123 B1 | 9/2014 | Perets et al. |
| 8,929,830 B2 | 1/2015 | Ludwig et al. |
| 8,934,609 B2 | 1/2015 | Pan et al. |
| 9,008,666 B1 | 4/2015 | Reeves et al. |
| 9,107,134 B1 | 8/2015 | Belser et al. |
| 9,130,641 B2 | 9/2015 | Mohebbi |
| 9,130,644 B2 | 9/2015 | Jayasinha |
| 9,392,512 B2 | 7/2016 | Su |
| 9,554,307 B2 | 1/2017 | Chen |
| 9,686,653 B2 | 6/2017 | Pitcher |
| 9,813,969 B2 | 11/2017 | Axmon et al. |
| 9,843,380 B1 | 12/2017 | Mitchell |
| 9,954,598 B2 | 4/2018 | Astrom et al. |
| 10,454,533 B1 | 10/2019 | Kogiantis et al. |
| 10,547,373 B2 | 1/2020 | Axmon et al. |
| 10,813,029 B2 | 10/2020 | Triolo et al. |
| 10,945,196 B2 | 3/2021 | Tang |
| 11,240,773 B2 | 2/2022 | Marshall |
| 11,337,127 B2 | 5/2022 | Dudzinski et al. |
| 11,343,825 B2 | 5/2022 | Logothetis et al. |
| 11,431,401 B2 | 8/2022 | Ning |
| 11,658,755 B2 | 5/2023 | Kogiantis et al. |
| 2002/0137538 A1 | 9/2002 | Chen et al. |
| 2002/0173269 A1 | 11/2002 | Grayson et al. |
| 2003/0069043 A1 | 4/2003 | Chhaochharia et al. |
| 2004/0174298 A1 | 9/2004 | Eriksson |
| 2004/0248519 A1 | 12/2004 | Niemela |
| 2005/0143118 A1 | 6/2005 | Bernhardsson et al. |
| 2005/0276247 A1 | 12/2005 | Heiman et al. |
| 2006/0239238 A1 | 10/2006 | Fernandez-Corbaton et al. |
| 2008/0002626 A1 | 1/2008 | Yokoyama |
| 2008/0156524 A1 | 7/2008 | Jachim et al. |
| 2008/0162106 A1 | 7/2008 | Johnson et al. |
| 2008/0181180 A1 | 7/2008 | Karaoguz |
| 2008/0220771 A1 | 9/2008 | Agarwal et al. |
| 2009/0003475 A1* | 1/2009 | Erceg .................. H04B 7/0626 375/260 |
| 2009/0125630 A1 | 5/2009 | Gogic |
| 2009/0137250 A1 | 5/2009 | Kurimoto et al. |
| 2009/0318153 A1 | 12/2009 | Maheshwari et al. |
| 2010/0008244 A1 | 1/2010 | Sampath et al. |
| 2010/0234024 A1 | 9/2010 | McGuffin |
| 2010/0291931 A1 | 11/2010 | Suemitsu et al. |
| 2010/0298001 A1* | 11/2010 | Dimou .................. G01S 11/08 455/441 |
| 2011/0002371 A1 | 1/2011 | Forenza et al. |
| 2011/0039561 A1 | 2/2011 | Narasimha et al. |
| 2011/0039569 A1 | 2/2011 | Narasimha et al. |
| 2011/0070841 A1 | 3/2011 | Caulfield |
| 2011/0176479 A1 | 7/2011 | Booton et al. |
| 2012/0008593 A1 | 1/2012 | Randriamasy et al. |
| 2012/0064918 A1 | 3/2012 | Nakayasu |
| 2012/0081248 A1 | 4/2012 | Kennedy et al. |
| 2012/0224619 A1 | 9/2012 | Hashigaya |
| 2012/0289233 A1 | 11/2012 | Medbo et al. |
| 2012/0315915 A1 | 12/2012 | Ohm et al. |
| 2013/0143503 A1 | 6/2013 | Li et al. |
| 2013/0281080 A1 | 10/2013 | Carmon |
| 2014/0153498 A1 | 6/2014 | Rousu et al. |
| 2015/0117399 A1 | 4/2015 | Yang et al. |
| 2015/0119045 A1 | 4/2015 | Montgomery et al. |
| 2015/0181544 A1 | 6/2015 | Liu et al. |
| 2016/0047884 A1 | 2/2016 | Zhang et al. |
| 2016/0192153 A1 | 6/2016 | Namba et al. |
| 2017/0111771 A1 | 4/2017 | Hague et al. |
| 2017/0127332 A1 | 5/2017 | Axmon et al. |
| 2017/0171792 A1 | 6/2017 | Axmon et al. |
| 2017/0374707 A1* | 12/2017 | Dai ..................... H01Q 1/3216 |
| 2018/0103351 A1 | 4/2018 | Emmanuel et al. |
| 2019/0028950 A1 | 1/2019 | Triolo et al. |
| 2019/0049548 A1* | 2/2019 | Miller ................. H04B 17/345 |
| 2019/0341811 A1 | 11/2019 | Elliott et al. |
| 2019/0394694 A1* | 12/2019 | Dent .................... H04W 36/16 |
| 2022/0286216 A1 | 9/2022 | Kogiantis et al. |

\* cited by examiner

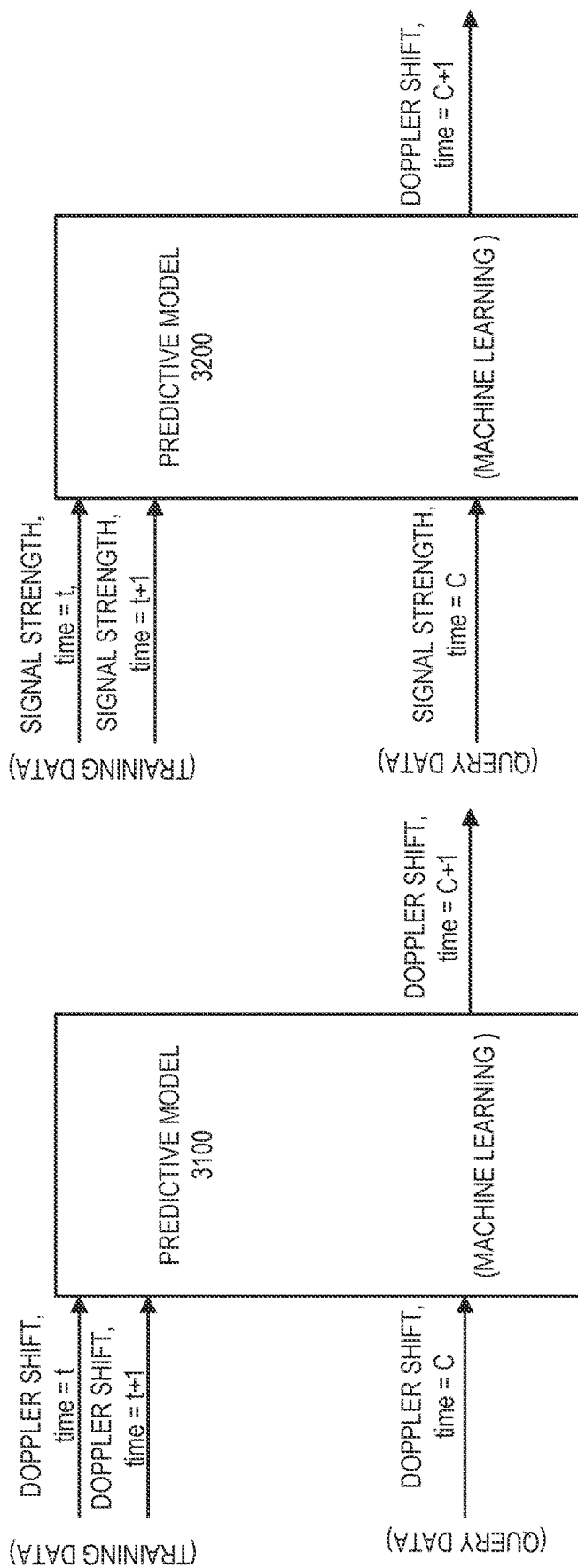

ADAPTIVE RADIO FREQUENCY COMMUNICATION

This invention was made with U.S. Government support under Agreement No. W15QKN-15-9-1004 awarded by the U.S. Army Contracting Command-New Jersey (ACC-NJ) to the National Spectrum Consortium (NSC). The U.S. Government has certain rights in this invention.

BACKGROUND

A cellular network can be characterized by multiple base stations arranged in a cellular pattern. Handover schemes for handing off mobile articles within a cellular network have included sensing signal strength. According to one known handover method, a mobile article can be connected to a first base station having a highest signal strength and can be handed off to a second base station based on a signal strength of the second base station exceeding a signal strength of the first base station.

Wireless communication systems typically are full duplex systems where communication can occur in a downlink transmission (i.e., transmission from the base station to the user device) and an uplink transmission (i.e., transmission from the user device to the base station) simultaneously. Full duplex systems can be either frequency division duplex (FDD) systems or time division duplex (TDD) systems. In a FDD system, the downlink and the uplink transmissions communicate over two separate frequency bands and associated center frequencies. Alternatively, in TDD systems, the downlink and uplink transmissions communicate over a single frequency band and associated center frequency.

However, the uplink and downlink communications are separated in time. In a full duplex communication system, both the uplink signal and downlink signal must remain active. If either the uplink or downlink signal is lost for a significant period of time, the full duplex connection will fail.

In commercial cellular wireless systems (for example, those based on 3GPP LTE standard for 4G wireless communication) user devices and base stations are designed to support communication links where the relative speed between a base station and a user device can be, for example, up to 400-500 km/hour. The greater the relative speed between a user device and a base station, the larger the Doppler shift that will occur during a transmission from one to the other.

BRIEF DESCRIPTION

There is set forth herein, in one embodiment, receiving, by a transceiver of a UE device an aggregate signal stream, the aggregate signal stream including an aggregate of basestation downlink signal streams from a plurality of base stations; processing the aggregate signal stream and detecting, from the processing of the aggregate signal stream, a set of base stations in communication range of the UE device, wherein the set of base stations include a current serving base station and a scanning base station; determining, from the processing of the aggregate signal stream, a Doppler shifted center frequency of a downlink scanning signal stream received from the scanning base station; and enhancing, in dependence on the Doppler shifted center frequency, the downlink scanning signal stream associated to the scanning base station.

There is set forth herein, in one embodiment, receiving by a transceiver of a UE device an aggregate signal stream, the aggregate signal stream including an aggregate of base station downlink signal streams from a plurality of base stations: processing the aggregate signal stream and detecting, from the processing of the aggregate signal stream, a set of base stations in communication range of the UE device; and enhancing a downlink scanning signal stream associated to a scanning base station in dependence on the detecting indicating that the scanning base station is included in the set of base stations in communication range of the UE device.

There is set forth herein, in one embodiment, receiving, by a transceiver of a UE device an aggregate signal stream, the aggregate signal stream including an aggregate of base station downlink signal streams from a plurality of base stations; processing the aggregate signal stream and detecting. from the processing of the aggregate signal stream, identifiers for a set of base stations in communication range of the UE device, and Doppler shift parameter values that specify Doppler shifts associated to respective base stations of the set of base stations, wherein the set of base stations include a current serving base station and a plurality of scanning base stations; storing into a data repository the identifiers for the set of base stations in communication range of the UE device, and associated to the identifiers for the set of base stations the Doppler shift parameter values that specify Doppler shifts associated to respective base stations of the set of base stations; monitoring an uplink signal stream transmitted by the transceiver; and in response to the monitoring the uplink signal stream extracting an identifier of a certain base station, and applying frequency compensation to the uplink signal stream with use of a Doppler shift parameter value stored in the data repository and associated to the certain base station.

There is set forth herein, in one embodiment, receiving, by a transceiver of a UE device, an aggregate signal stream, the aggregate signal stream including an aggregate of base station downlink signal streams from a plurality of base stations; processing the aggregate signal stream and detecting. from the processing of the aggregate signal stream, identifiers for a set of base stations in communication range of the UE device, and Doppler shift parameter values that specify Doppler shifts associated to respective base stations of the set of base stations, wherein the set of base stations include a current serving base station and one or more scanning base station; storing into a data repository the identifiers for the set of base stations in communication range of the UE device, and Doppler shift parameter values that specify Doppler shifts associated to respective base stations of the set of base stations so that there are recorded within the data repository Doppler shift datasets, the Doppler shift datasets associating to identifiers for respective base stations of the set of base stations Doppler shift parameter values; and transmitting by the transceiver of a UE device, an uplink signal stream to a certain scanning base station of the one or more scanning base station that has been selected as a serving base station, wherein selection of the certain scanning base station as a serving base station has included an examination of data of the Doppler shift datasets.

There is set forth herein, in one embodiment, receiving, by a transceiver of a UE device, an aggregate signal stream, the aggregate signal stream including an aggregate of base station downlink signal streams from a plurality of base stations; processing the aggregate signal stream and detecting, from the processing of the aggregate signal stream, identifiers for a set of base stations in communication range of the UE device, and signal strength parameter values that specify signal strength associated to respective base stations of the set of base stations, wherein the set of base stations include a current serving base station and one or more scanning base station; storing into a data repository the identifiers for the set of base stations in communication range of the UE device, and signal strength parameter values that specify signal strength associated to respective base stations of the set of base stations so that there are recorded within the data repository signal strength datasets, the signal strength datasets associating to identifiers for respective base stations of the set of base stations signal strength parameter values; repetitively performing the processing and the storing so that there are recorded within the data repository signal strength time series datasets, the signal strength time series datasets associating to identifiers for respective base stations of the set of base stations signal strength parameter values over time; transmitting, by the transceiver of a UE device, an uplink signal stream to a certain scanning base station of the one or more scanning base station that has been selected as a serving base station, wherein selection of the certain scanning base station as a serving base station has included an examination of data of the signal strength time series datasets.

DRAWINGS

These and other features, aspects, and advantages set forth herein will become better understood when the following detailed description is read with reference to the accompanying drawings in which like characters represent like parts throughout the drawings, wherein:

FIG. 15 is a diagram illustrating a predictive model trained by machine learning according to one embodiment;

FIG. 16 is a diagram illustrating a predictive model trained by machine learning according to one embodiment;

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
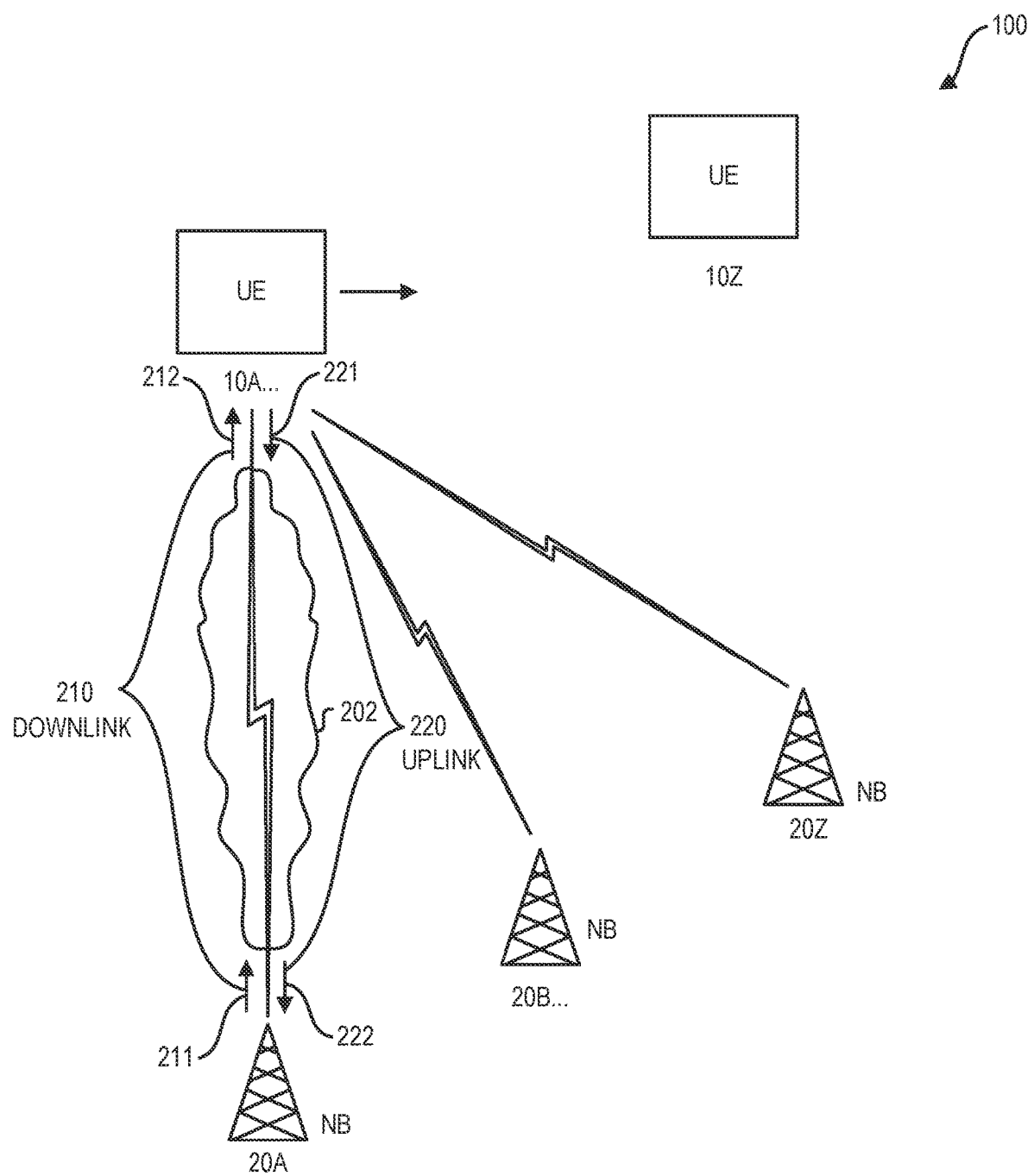
FIG. 1 is schematic diagram illustrating a radio communication environment according to one embodiment.

Radio communication environment 100 is shown in FIG. 1. Radio communication environment 100 can include a plurality of UE devices 10A-10Z and a plurality of base stations 20A-20Z. In radio communication environment 100, a UE device such as UE device 10A can travel at high speeds. In one example, a UE device 10A can be an airborne UE device, e.g., carried by an aircraft. UE device 10A can travel between coverage areas of different base stations. For example, UE device 10A at a first time can be connected to base station 20A which can serve as the currently serving base station (CSBS). Sometime later, a handover can be performed and UE device 10A can become connected to base station 20B which can become the current serving base station (CSBS).

Embodiments herein can detect for and can compensate for Doppler shifts in base station signal streams from and to base stations in communication range of a UE device 10A-10Z. Referring to FIG. 1 a downlink base station signal stream 210 can refer to downlink transmitted signal stream 211 which is the initially downlink transmitted signal from base station 20A and can include downlink received signal stream 212, which is the downlink signal stream received at UE device 10A. Uplink base station signal stream 220 herein can refer to in uplink transmitted signal stream 221, which is the uplink signal stream transmitted from UE device 10A and an uplink received signal stream 222 as shown in FIG. 1, which is the uplink signal stream received at base station 20A. Embodiments herein recognize that downlink base station signal stream 210 and uplink base station signal stream 220 transmitted through air medium 202 can be subject to a substantial Doppler frequency shift when UE device 10A travels at high speeds. The UE device 10 in a typical scenario will introduce this Doppler shift into the uplink signal stream that transmits toward the base station 20A. As a result, the uplink signal stream received at the base station 20A may experience a Doppler shift that is twice that which is experienced at the UE device 10A.

Embodiments herein can dynamically detect and estimate Doppler shifts in a wireless communication system. Embodiments herein can estimate and compensate for Doppler frequency shifts on either, or both, a downlink transmission signal stream or an uplink transmission signal stream.

Figure 3:
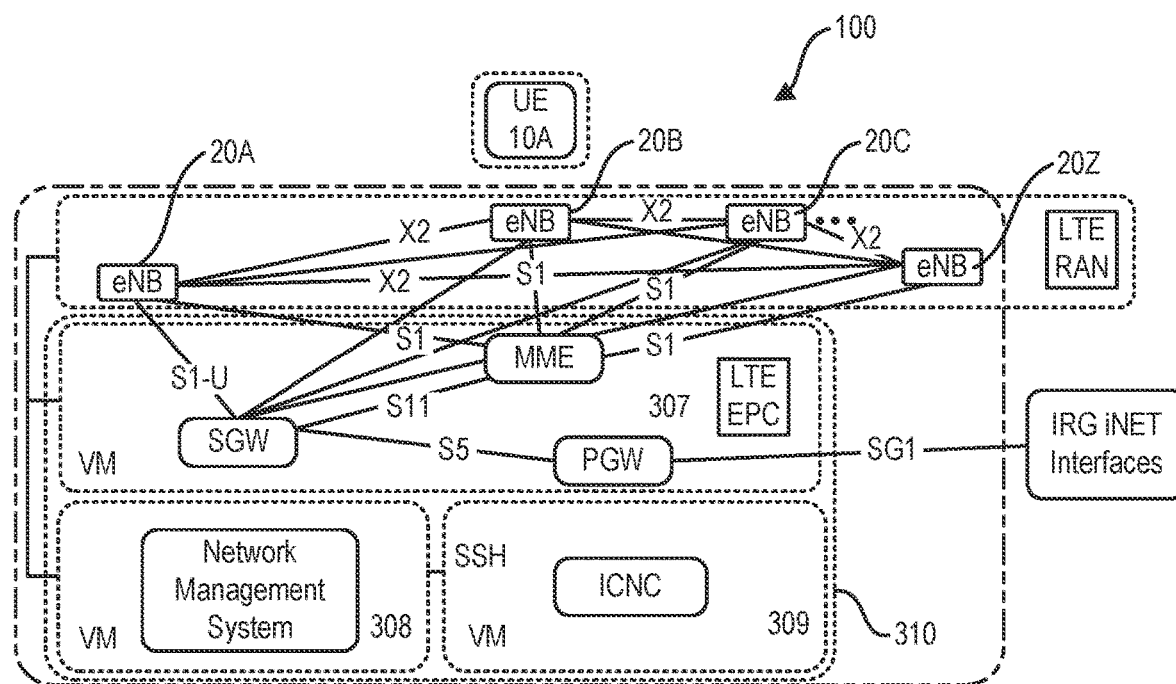
FIG. 3 is a block diagram illustrating a UE device in communication with a ground based computing system according to one embodiment.

According to one implementation, radio communication environment 100 can be provided by a Cellular Range Telemetry Network (CeRTN) as shown in FIG. 3. A CeRTN can comprise cellular network infrastructure supporting airborne mobile telemetry. Specifically, there is set forth herein, in one embodiment, an airborne mobile telemetry system using a cellular network based on standards of the $3^{rd}$ Generation Partnership Project's (3GPP) such as the Long-Term Evolution (LTE), LTE-Advanced (LTE-A) standard, and/or standards defining the $5^{th}$ generation (5G) mobile network, including the 5G New Radio (NR) standard. A cellular network comprising multiple base stations organized in a cellular pattern can be used to communicate with the airborne UE devices. Embodiments herein can be based on easily obtained commercially available off the shelf (COTS) components, which will lead to substantial reduction in the cost of building and operating the telemetry system. FIG. 1 shows a schematic of a CeRTN system supporting airborne range telemetry. A UE device 10A-10Z set forth herein can be provided in one embodiment, e.g., by a portable hand held transceiver equipped computer system with an antenna link, or an aircraft installed transceiver equipped computer system with an antenna link.

Figure 2:
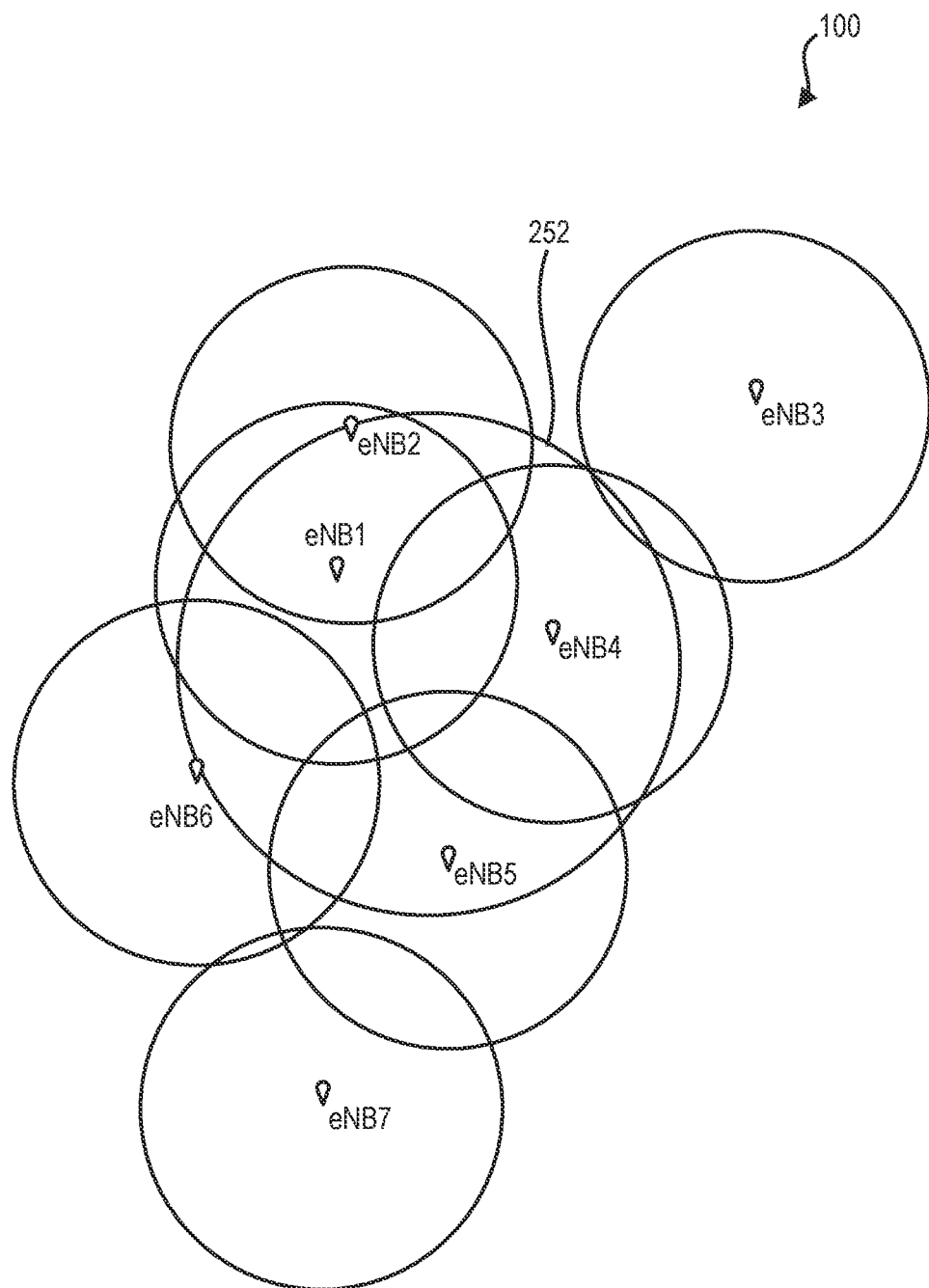
FIG. 2 is a schematic diagram illustrating a radio communication environment according to one embodiment.

The exemplary CeRTN shown in FIG. 2 comprises seven (7) base stations according to base stations 20A-20Z which can be provided by eNodeBs (eNBs) supporting communication based on the LTE-A standard. FIG. 2 also shows the coverage areas associated with each of these base stations. When an AA goes on a flight following a certain (predetermined) flight path, it moves from the coverage area of one base station to that of another. For instance, if a UE device follows the flight path represented by circle 252, indicated in FIG. 2, it will move from the coverage area of eNB1 to that of eNB6, and so on. In the described CeRTN, the UE device can be handed over from one base station to another as its position moves between the corresponding coverage areas. In order to ensure that the communication link between the UE device 10A and the telemetry stations on the ground remains strong enough to support the desired data rates, the UE device 10A can be connected to the base station with which it can maintain a good-quality link. Moreover, as the quality of this link deteriorates due to the movement of the UE device, the latter can be quickly handed over to another base station that is now able to provide the desired link. The eNode Bs of FIG. 2 can alternately be provided by 5G compliant gNodeBs.

As shown in FIG. 3, the eNBs in a CeRTN can be interconnected with the X2 interfaces (when available) and each eNB can be connected to an MME through an S1 interface on the control plane and to the SGW with a S1-U interface on the user plane. The group of eNBs comprises a RAN, while the rest of the functional elements other than the Network Management System and ICNC comprise the LTE Evolved Packet Core (EPC). The LTE RAN and the LTE EPC together are referred to as the LTE network. It should be highlighted that the interfaces are IP based and are logical. That is, no direct eNB-eNB physical connection is required. The control plane's physical connection links can be routed through the MME, if the MME is located at a central location. The X2 interface implies that packets originating in one eNB terminate at another eNB without the MME processing these packets. The Evolved Packet Core provides data to external elements, like the existing range telemetry system, through the SGi interface. The entire LTE network is managed through the Network Management System (NMS). Each vendor calls this system something different, since it is not a standardized element. However, the functionality remains the same, that is, manage parameters and settings on all of the LTE network elements. As far as this invention is concerned, the key element of the proposed CeRTN system is the Integrated Cellular and Network Controller, or ICNC for short. The ICNC interacts with the elements of the LTE network to actively force handovers to desired eNodeBs, the mechanism to do so is through the Network Management System. Parameters of the LTE network can be modified in real-time through the interface to the NMS. Physically, the EPC, the NMS, and the ICNC in one embodiment can be collocated on the same server, with each element existing within its own Virtual Machine. EPC 307 in combination with an MS 308 and ICNC 309 can define manager system 310 and manager system 310 in combination with base stations 20A-20Z can define a ground based computer system. The components as set forth herein including in reference to FIGS. 1-3 can be compliant with standards of the $3^{rd}$ Generation Partnership Project's (3GPP) such as the Long-Term Evolution (LTE), LTE-Advanced (LTE-A) standard, and/or standards defining the $5^{th}$ generation (5G) mobile network, including the 5G New Radio (NR) standard.

Figure 4:
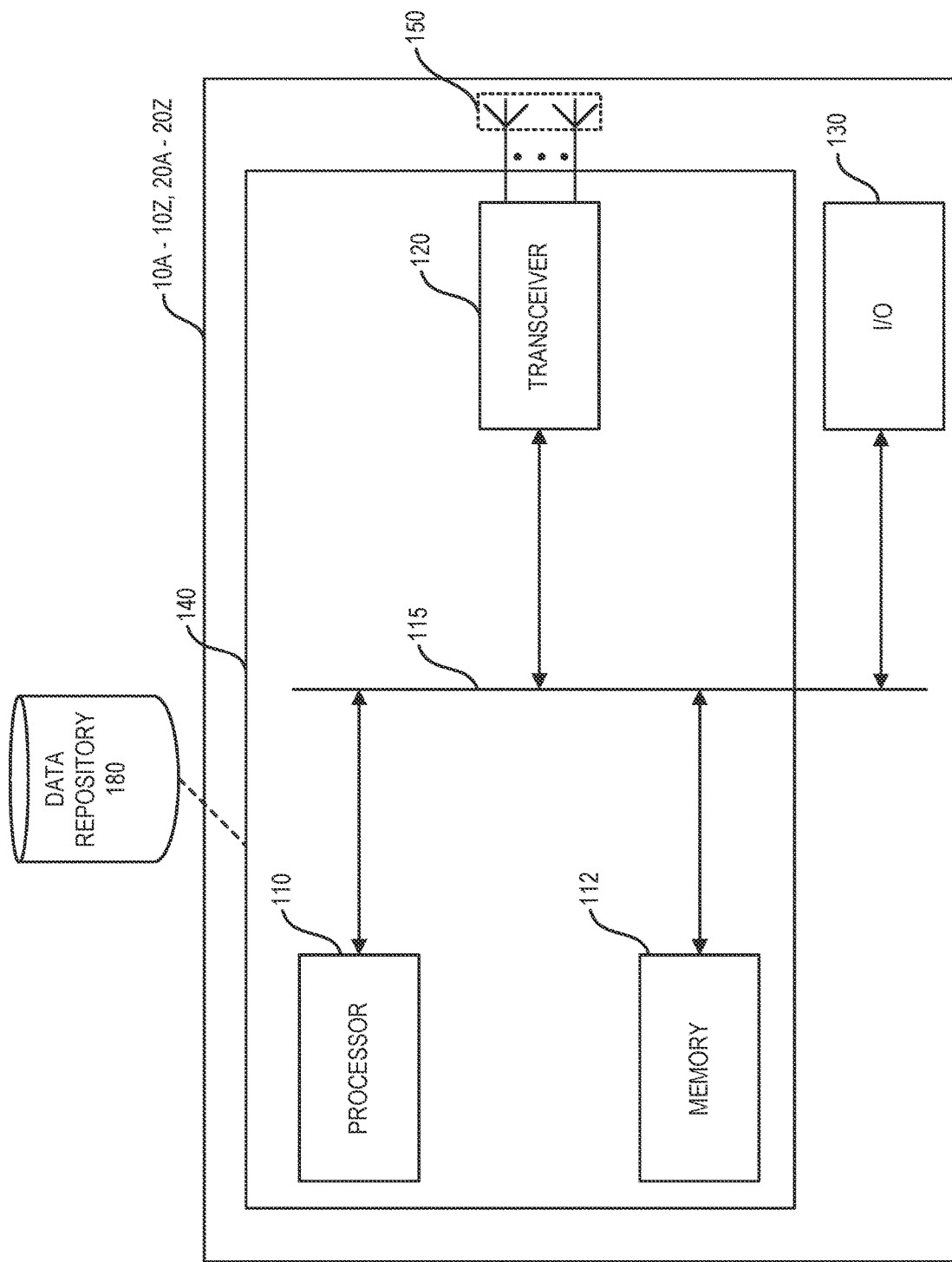
FIG. 4 is block diagram illustrating communication node provided by a UE device or a base station according to one embodiment.

FIG. 4 illustrates a communication node that can be configured as a UE device 10A-10Z or a base station 20A-20Z. The communication node of FIG. 4 can include one or more processor 110, and memory 112. Memory 112 can be provided by a system memory which can include volatile and nonvolatile memory. The communication node of FIG. 4 can also include one or more transceiver such as transceiver 120 and an additional one or more I/O device 130. One or more additional I/O device 130A can include, e.g., one or more additional transceiver for support of communications according to second standard, one or more display, one or more wireline network interface, and the like.

Transceiver 120 can receive analog radio frequency signals from respective sets of one or more antenna. Each respective antenna can pick up a signal from a base station, or, if more than one base station is in pickup range aggregate signals from multiple base stations. In the described embodiment of FIG. 4, transceiver 120 can be connected to and can receive signals from one or more antenna 150. One or more processor 110, memory 112, transceiver 120, and one or more additional I/O device 130 can be in communication and can be connected to system bus 115, which can include a data bus, an address bus, and a control bus.

A schematic diagram of transceiver 120 connected to one or more antenna 150 is illustrated in reference to FIG. 4. Referring to the radio transceiver of FIG. 4, the depicted transceiver 120 can include modem 1230 and RF circuitry 1220. RF circuitry 1220 of transceiver 120 in turn can be connected to one or more antenna 150. In operation the transceiver of FIG. 4 for transmission of radio frequency signals can modulate a baseband frequency signal by modem 1230 using digital bitstream from system bus 115 so that the baseband signal generated within modem 1230 encodes the digital information of the digital bitstream received from system bus 115. Modem 1230 in turn can output a baseband frequency modulated signal to RF circuitry 1220. RF circuitry 1220 in turn can up-convert the modulated baseband frequency signal from modem 1230 and can perform further processing, such as amplifying and filtering the up-converted signal up-converted by RF circuitry 1220. RF circuitry 1220 can send an output signal to one or more antenna 150 for emission by one or more antenna 150.

For receiving a signal stream, RF circuitry 1220 can receive from one or more antenna 150 radio frequency signals that are picked up by one or more antenna 150 and can subject such received radio frequency signals to down-conversion, and other processing such as filtering, and can propagate the down-converted baseband received signal stream to modem 1230. Modem 1230 can demodulate the down-converted signal, down-converted to the baseband frequency. By demodulating the down-converted signal, modem 1230 can output digital bitstream to system bus 115.

Modem 1230 can perform modulating and demodulating using modulation/demodulation schemes such as quadrature amplitude modulation (QAM) or phase shift keying (PSK). RF circuitry 1220 can perform such functions as up-conversion/down-conversion, amplifying, filtering and beam steering.

Figure 5:
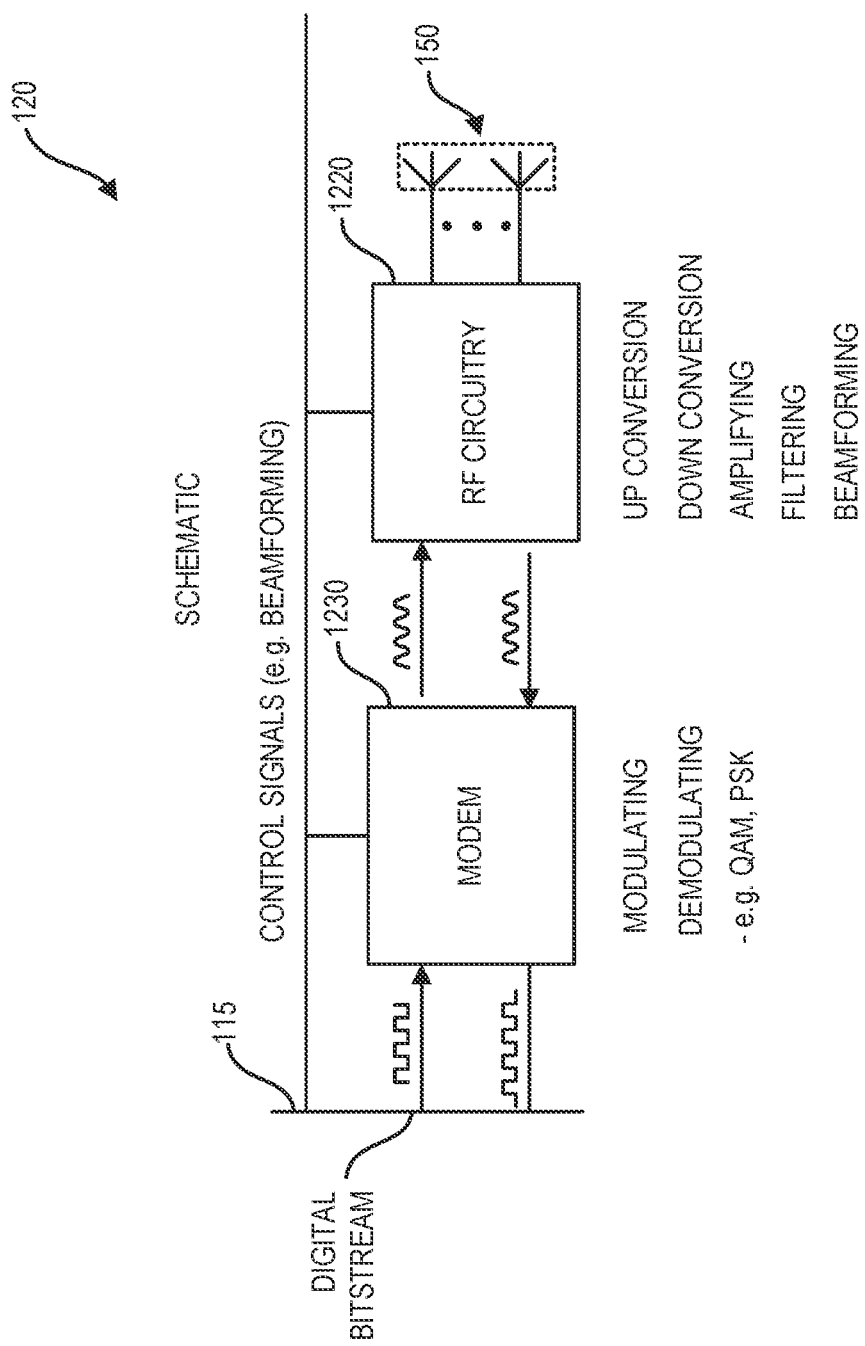
FIG. 5 is a schematic block diagram illustrating a transceiver according to one embodiment.

Another functional schematic diagram of transceiver 120 is shown in FIG. 5. A transceiver 120 can include a modem 1230, RF circuitry 1220, and one or more antenna 150. A transceiver 120 can also include various circuitry permitting programmable control of the transceiver. According to one example, a respective transceiver of transceivers 120 can include computing node control circuitry 1240 and field programmable gate array (FPGA) control circuitry 1250.

Computing node control circuitry 1240 of transceiver 120 can include, e.g., one or more processor 1241 memory 1242 and one or more I/O device 1243 connected by system bus 1244. Control circuitry 1240 and/or FPGA control circuitry 1250 can be used to perform a wide variety of control operations. Such operations can include, for example, performing of beam forming to augment signal reception/and or transmission in certain directions, switching on signal transmission paths through one or more sets of antennas of one or more antenna 150, switching off receive signal paths from one or more sets of antennas of one or more antenna 150, generating and adjusting local oscillator signals for control of up conversion, generating and adjusting local oscillator signals for generating for control of down conversion.

As indicated by FIG. 5, beamforming control signals and other control signals for control of modem of RF circuitry 1220, modem 1230, as well as control circuitry, such as computing node control circuitry 1240 and FPGA control circuitry 1250, can be received from system bus 115 shown in FIG. 4 or can be internally generated by transceiver 120. Referring again to FIG. 4 signal processing operations of a communication node can be performed by signal processing circuit 140. Signal processing circuit 140 can include, e.g., in-combination one or more processor 110, memory 112, and one or more transceiver 120. Control functions can be performed by control circuitry of one or more transceiver, such as computing node control circuitry 1240 and/or FPGA control circuitry 1250 as described in connection with FIG. 6 and/or can be performed by one or more processor 110 or, according to one embodiment, can be shared between one or more processor 110 and control circuitry of one or more transceiver. Signal processing circuitry 140 by one or more memory of a transceiver 120 and/or memory 112 can define a data repository 180 for storage of data including for storage of parameter values for the control of a communication node such as UE device 10A-10Z or base station 20A-20Z.

Figure 6:
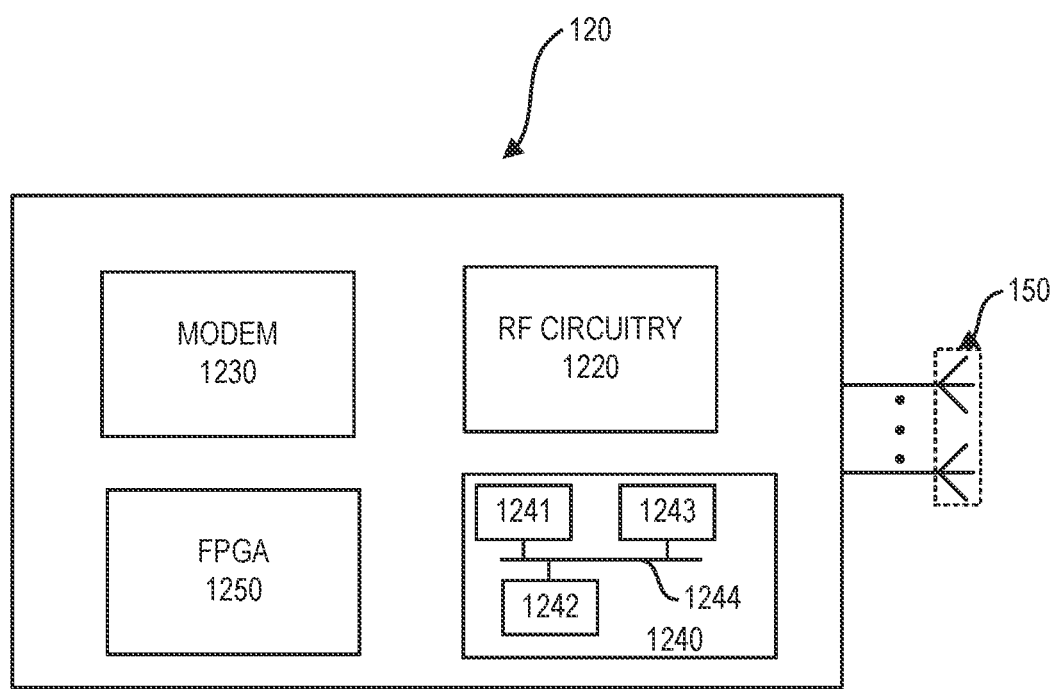
FIG. 6 is a schematic block diagram illustrating a transceiver according to one embodiment.
Figure 7:
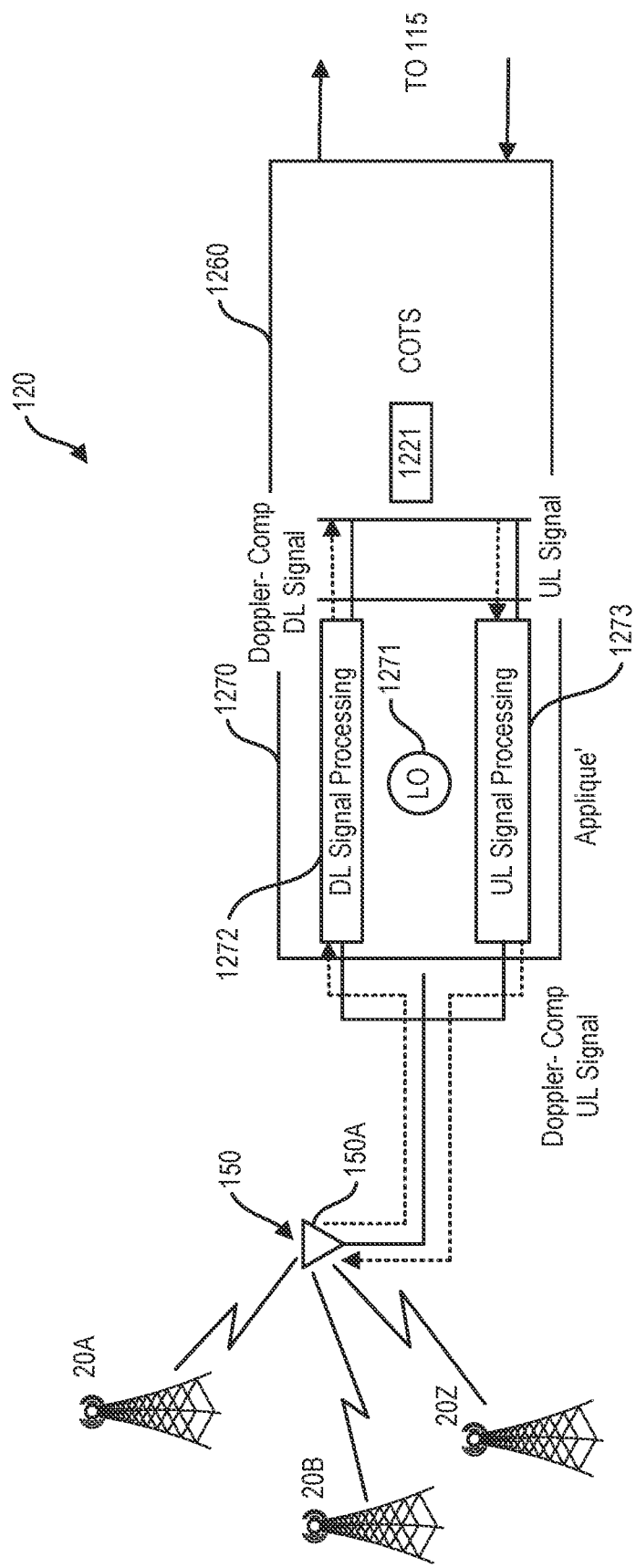
FIG. 7 is a schematic block diagram illustrating a transceiver according to one embodiment.

Referring to FIG. 7 in one embodiment, transceiver 120 can be provided using commercially available off-the-shelf (COTS) circuitry 1260 interfaced to custom applique circuitry 1270. In one embodiment, transceiver 120 can include COTS circuitry 1260 and applique circuitry 1270. Applique circuitry 1270 can include downlink signal processing circuitry 1272 and uplink signal processing circuitry 1273. Applique circuitry 1270 can include reference frequency generating device 1271 for generating and transmitting an accurate reference frequency. The reference frequency generating device 1271 may include, by way of example but not limitation, an oven controlled crystal oscillator (OCXO), a microprocessor compensated crystal oscillator (MCXO) or an atomic oscillator (such as a rubidium or cesium based atomic oscillator). The reference frequency generating device 1271 generates and transmits a reference frequency that has a predetermined range of accuracy which is generally measured in parts per billion (ppb). For example, reference frequency generating device 1271 based on OCXOs and MCXOs may have reference frequency accuracy ranges in the order of 10 to 50 ppb. Also, reference frequency generating device 1271 based on atomic oscillators may have reference frequency accuracy ranges that are in the order of 0.1 to 0.5 ppb. Instances of Control circuitry 1240 and/or control circuitry 1250 described with reference to FIG. 6 can be incorporated into each of COTS circuitry 1260 and applique circuitry 1270. Instances of RF circuitry 1220 and modem 1230 described with reference to FIG. 5 and FIG. 6 can be incorporated into each of COTS circuitry 1260 and applique circuitry 1270. COTS circuitry 1260 can include an instance of RF circuitry 1220 and modem 1230 (FIG. 6). In one aspect, COTS circuitry 1260 can include down converter 1221 of RF circuitry 1220 that can track a center frequency of serving signal stream from a serving base station.

A method for performance by UE device 10A interoperating with current serving base station 20A and scanning base stations 20B-20Z is described with reference to FIG. 8. In the described scenario referenced in FIG. 8, base station 20A can be the current serving base station (CSBS), and base stations 20B-20Z can be scanning base stations that are detectable by UE device 10A but which are not the current serving base station. Scanning base stations 20B-20Z can be regarded to be candidate serving base stations. In one aspect, a scanning base station can refer to a base station that broadcasts its presence, and which UE device 10A has detected, but which the UE device 10A is not connected to.

Figure 8:
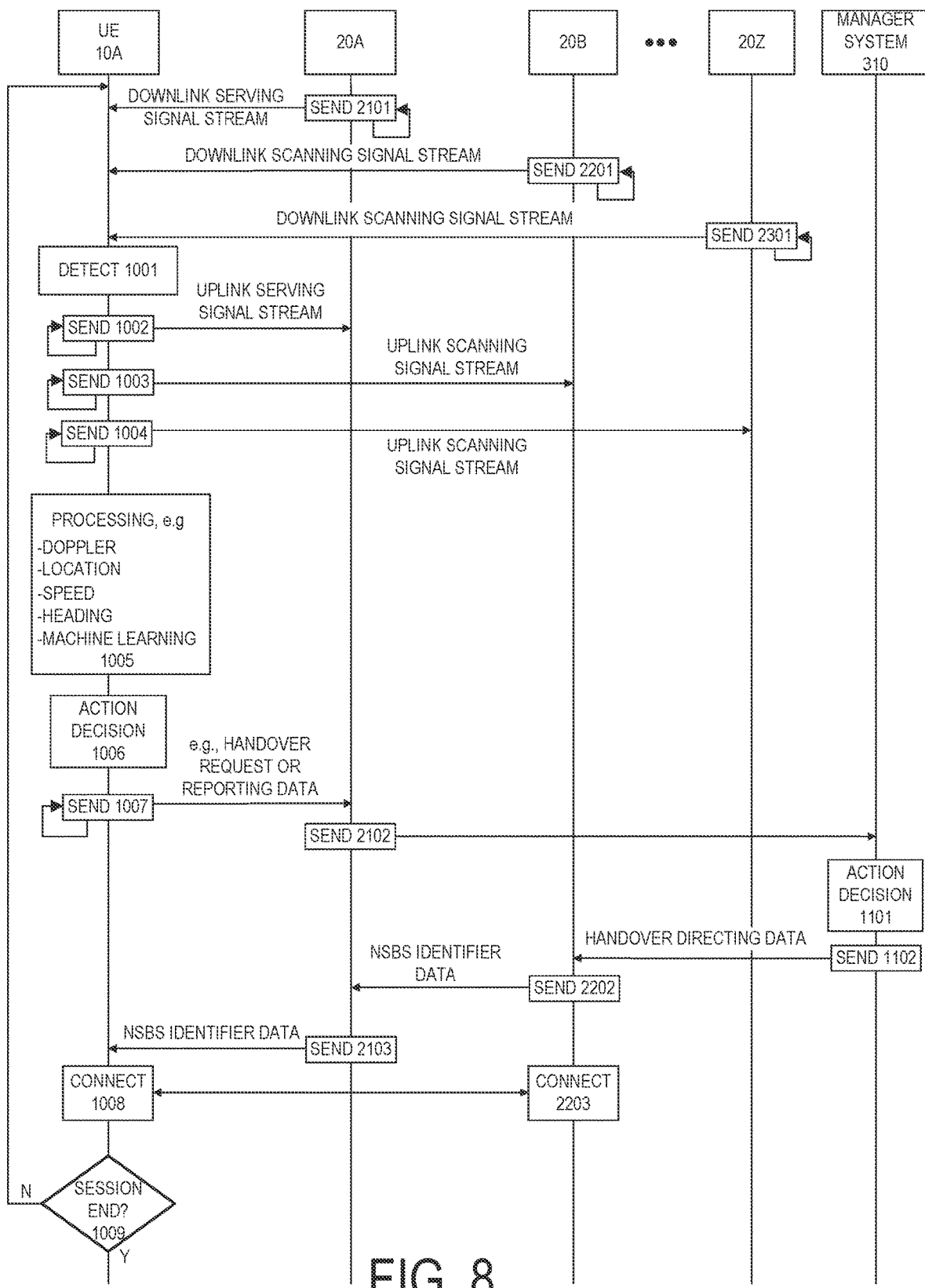
FIG. 8 is flowchart illustrating a UE device interoperating with base stations in communication with the UE device and with a ground based computing system according to one embodiment.

With reference to the flowchart of FIG. 8, base station 20A can be repetitively, e.g. continuously, sending a downlink serving stream at block 2101, and base stations 20B-20Z can be, e.g., continuously sending scanning signal streams at blocks 2201 and 2301. UE device 10A can be responsively receiving the repetitively sent downlink serving signal stream from base station 20A, and the repetitively sent scanning signal streams from base stations 20B-20Z. It will be understood that the noted serving and scanning signal streams can be received as an aggregated signal on one or more antenna 150.

At detect block 1001 UE device 10A can be detecting one or more signal stream and characteristics thereof, and can be responsively applying one or more signal enhancement. At detect block 1001, UE device 10A can be repetitively performing compensation in response to received base station scanning signal streams. Embodiments herein recognize that challenges exist in respect to the receipt and processing of base station scanning signal streams in environments in which substantial Doppler shifts of transmitted base station signals can be observed.

According to one signal enhancement that can be applied at block 1001, UE device 10A can detect a Doppler shift within a received base station signal stream of the currently serving base station 20A and can apply one or more frequency compensation in response to the detected Doppler shift. The one or more applied frequency compensation can include applying a frequency compensation to the uplink signal stream in dependence on the detected Doppler shift so that the uplink signal stream is received at the currently serving base station with a center frequency at about the uplink network reference center frequency (the expected center frequency in the absence of the any Doppler shift of the downlink or uplink). By such compensating, the currently serving base station can continue to reliably receive uplink signal stream from UE device 10A. Referring to FIG. 1, embodiments herein can configure UE device 10A so that UE device 10A compensates uplink signal stream 220 (the transmitted uplink signal stream 221) for Doppler shift so that uplink signal stream 220 (the received uplink signal stream 222) received at base station 20A is received at about the network reference center frequency of base station 20A. For performing such compensation and enhancement, transceiver 120 can detect the Doppler shift of downlink signal stream 210 (the received downlink signal stream 212) and can compensate uplink signal stream 220 (the transmitted uplink signal stream 221) in dependence on the detected Doppler shift.

Embodiments herein recognize that while the described compensation can improve communications to a currently serving base station, challenges persist with respect to communications to scanning base stations, which challenges can impact handover to a next serving base station. Embodiments herein can include features so that received downlink signal stream 212 from scanning base stations, e.g., base stations 20B-20Z are not negatively impacted by a Doppler shift associated to received downlink signal stream 212 received UE device 10A.

Embodiments herein recognize that according to operation of a transceiver, a local oscillator signal for down conversion of a received downlink serving signal stream can dynamically track to match a center frequency of the received downlink serving signal stream. For tracking the center frequency of the serving signal stream, the center frequency of a down conversion local oscillator signal can dynamically change in response to changes in a center frequency of a serving signal stream to remain at a center frequency that optimizes the receipt of a base station signal stream having the characterizing center frequency of the current serving base station. A down conversion local oscillator signal can be regarded to match a base station signal stream when its center frequency optimizes down conversion recovery of the base station signal stream.

Embodiments herein recognize that the tracking of the local oscillator signal for down conversion to the serving signal stream which is subject to a Doppler shift can result in a local oscillator signal having a frequency that is mismatched with respect to center frequencies of downlink scanning signal streams received from scanning base stations. Embodiments herein recognize that the mismatch of a local oscillator signal for down conversion and a center frequency of the scanning base station can result in scanning base station signal streams being observed to be weaker than they actually are and in some instances can result in detection of the scanning base station signal being delayed or prematurely lost. In the described compensating scheme, a local oscillator signal for controlling down conversion of a received downlink signal stream 212 can track center frequency of the received downlink signal stream 212. Embodiments herein recognize that the local oscillator signal for down conversion tracking a Doppler shift can negatively impact the transceiver's ability to accurately receive signals from scanning base stations 20B-20Z as shown in FIG. 1. Embodiments herein recognize that a transceiver down converter tracking and locking on to a serving signal stream can negatively impact the transceiver's ability to accurately down convert a base station signal stream where the center frequency spacing between the scanning signal stream and the base station signal stream increases.

UE device 10A at block 1001 can apply one or more signal enhancement in dependence on a detected one or more base station signal stream. The one or more enhancement can include one or more enhancement so that scanning signal streams received from scanning base stations 20B-20Z more accurately reflect strength of signals received from those scanning base stations.

A specific implementation of block 1001 is described with reference to the flowchart of block 9. Referring to the flowchart of FIG. 9, UE device 10A at block 6002 can receive an aggregate base station signal stream on one or more antenna 150. UE device 10A at block 6004 can identify detected base stations from the aggregate base station signal stream. At block 6006, UE device 10A can update a list of detected base stations and Doppler shifts associated to the respective base stations. At block 6008, UE device 10A can configure receive signal paths associated to respective ones of the detected base stations and can enhance one or more base station signal stream.

In one embodiment, UE device 10A at block 6004 can be configured to repetitively identify detected base stations in its detection range. UE device 10A can identify base stations in its detection range by monitoring for synchronization signals received from various base stations within received downlink base station signal streams. On detection of a synchronization signal indicating a base station, UE device 10A at block 6004 can record for the detected base station into data repository 180, e.g., a base station identifier, and a Doppler shift associated to the detected base station. UE device 10A at block 6004 can also record for the detected base station into data repository 180, e.g., a center frequency of base station signal streams associated to the various detected base stations, signal strength associated to the various detected base stations, as well as additional channel estimation information associated to the various detected base stations.

Using information of a detected base station, UE device 10A at block 6008 can enhance a scanning base station signal stream so that a signal strength of the scanning signal stream can be accurately detected.

Figure 10:
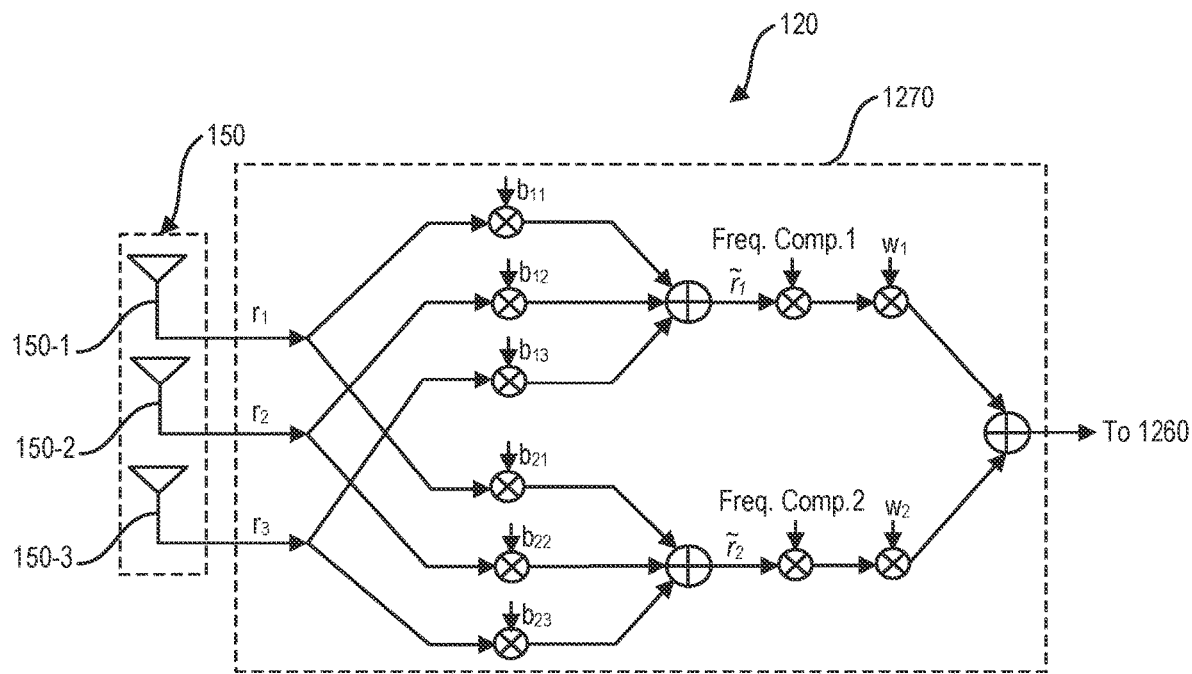
FIG. 10 is a schematic block diagram illustrating a transceiver according to one embodiment.
Figure 11:
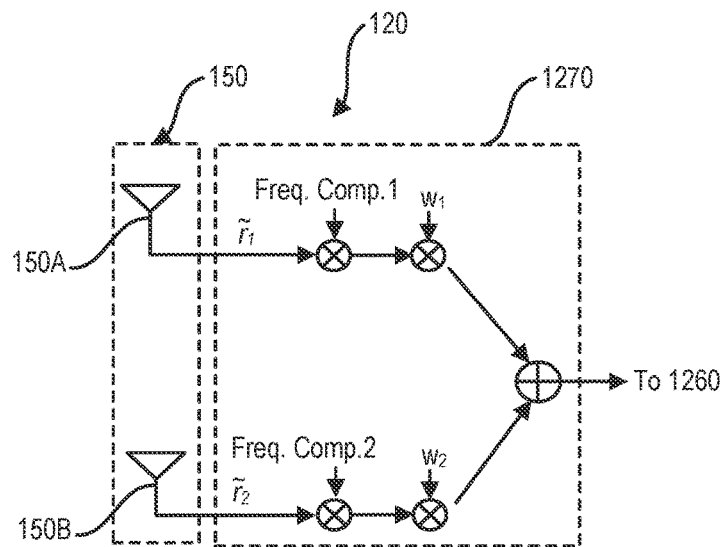
FIG. 11 is a schematic block diagram illustrating a transceiver according to one embodiment.

In the embodiment of FIGS. 10 and 11, enhancing of a scanning signal stream can include (a) applying frequency compensation to the scanning signal stream, (b) combining the frequency compensated scanning signal stream with a frequency compensated serving signal stream. In one embodiment, the serving signal stream can be a frequency compensated serving signal stream so that the combining the frequency compensated scanning signal stream with the serving signal stream can include combining the frequency compensated scanning signal stream with a frequency compensated serving signal stream. Applied frequency compensations to the scanning signal stream and the serving signal stream can be in amounts determined by respected Doppler shifts detected for those steams. In one embodiment, the scanning signal stream and the serving signal stream can be weighted. Thus, in one embodiment, the combining the frequency compensated scanning signal stream with a frequency compensated serving signal stream can include combining a weighted frequency compensated scanning signal stream with a weighted frequency compensated serving signal stream. The frequency compensating of the scanning signal stream and the serving signal stream can produce a combined signal having scanning signal stream and serving signal stream components with closely spaced center frequencies that are both proximate to a network center frequency. The combined signal can be fed into a down converter of RF circuitry 1220 that is configured to track a center frequency of a serving signal stream. Because with the described processing center frequencies of scanning signal steam and a serving signal stream can be closely spaced, a down converter tracking a serving signal stream can accurately down convert both serving signal stream and scanning signal stream components of the combined signal.

In one embodiment, the combining the frequency compensated scanning signal stream with the serving signal stream can include combining the frequency compensated scanning signal stream with a frequency un-compensated serving signal stream. In such an embodiment, the frequency compensation applied to the scanning signal stream can be dependent on a center frequency spacing between the scanning signal stream and the serving signal stream so that by the frequency compensation of the scanning signal stream, the center frequency of the scanning signal stream is made about equal to a center frequency of the serving signal stream.

The described processing can produce an aggregate signal that emulates an RF signal picked up by a UE device transceiver antenna operating in an environment wherein substantial Doppler shift is not observed. The described processing can enhance a scanning signal stream by providing a scanning signal stream having a center frequency closely spaced to a center frequency of the serving signal stream such that down conversion of a combined signal having serving signal stream and scanning signal stream components can produce a down converted signal that accurately represents the scanning signal stream and serving signal stream.

Referring to FIG. 10 and FIG. 11, there is described a transceiver 120 configured for (a) applying frequency compensation to the scanning signal stream, (b) combining the frequency compensated scanning signal stream with a frequency compensated serving signal stream. Circuitry for (a) applying frequency compensation to the scanning signal stream, (b) combining the frequency compensated scanning signal stream with a frequency compensated serving signal stream can be incorporated as part of applique circuitry 1270.

For combining the frequency compensated scanning signal stream with a frequency compensated serving signal stream, embodiments herein can provide a scanning signal aggregate signal stream in which a scanning signal stream is enhanced and a serving signal aggregate stream in which the serving signal stream is enhanced. In the embodiment of FIG. 10, stream $\tilde{r}_1$ defines an aggregate signal stream with components of multiple base station signal streams in which a serving signal stream is enhanced and stream $\tilde{r}_2$ defines an aggregate signal stream with components of multiple base station signal streams in which a certain scanning signal stream is enhanced. Streams $\tilde{r}_1$ and $\tilde{r}_2$ can advantageously feature aggregate signal characteristics and can retain minor components attributable to base stations signal streams other than the emphasized base station signal stream.

For providing aggregate signal streams in which a base station signal stream of a particular base station is enhanced one or more antenna 150 can be provided by multiple antennas and applique circuitry 1270 can apply beam forming weights to the multiple antennas. Referring to the beam forming weights of the embodiment of FIG. 10, applique circuitry 1270 can compute the beamforming weights associated with K receive antennas 150-1, 150-2, 150-3, for the current serving base station 20A as well as for a scanning base station 20B. The downlink signal streams received by the K antennas can be denoted by $r_1(t), r_2(t), \ldots, r_K(t)$ as indicated by the antenna picked up signals r1, r2, and r3 depicted in FIG. 10. Embodiments herein recognize that each of these received signals r1, r2, and r3 consists of a sum of the signals received from the serving base station 20A, zero or more candidate base stations 20B-20Z and noise and interference from other sources.

According to the embodiment of FIG. 10, one or more antenna 150 connected to transceiver 120 can be provided by K receive antennas. According to one embodiment, applique circuitry 1270 can use a minimum-mean-squared-error (MMSE) method to compute beamforming weights that enhance the signal received from a specific base station. According to this method, the beamforming weight vector $b=[b_1, b_2, \ldots, b_K]^T$, where $b=C^{-1}\hat{h}$. Here C is the covariance matrix for the received signal vector and $\hat{h}=[\hat{h}_1, \hat{h}2, \ldots, \hat{h}_K]$ is the vector of channel estimates associated with the base station whose received signal is being enhanced via beamforming. In this manner, beamforming weights for a serving base station and a scanning base station can be computed. If there is no scanning signal stream detected, the computation of beamforming weights can be restricted to the serving base station. Let $r=[r_1, r_2, \ldots, r_K]^T$ be the received signal vector whose entries consist of signal samples from the K antennas, and let $b_1=[b_{1,1}, b_{1,2}, \ldots, b_{1,K}]$ and $b_2=[b_{2,1}, b_{2,2}, \ldots, b_{2,K}]$ be the beamforming vectors associated with the target base station and the desired candidate base station. Applique circuitry 1270 an apply these two sets of beamforming weights to the received signal vector r to form two signal streams $\tilde{r}_1$ and $\tilde{r}_2$ where $\tilde{r}_1=b_1{}^*r$ and $\tilde{r}_2=b_2{}^*r$. (Here, "( )*" represents conjugate transpose). According to one embodiment, beamforming weights can be computed by down-converting the received signal to the baseband; however, once computed, the beamforming weights can be applied directly to the RF signal. Applique circuitry 1270 can repetitively apply beamforming weights at block 1001.

Referring to FIG. 10 there are shown RF signal streams, $\tilde{r}_1$ and $\tilde{r}_2$, that respectively have enhanced signal components from the target base station and the desired candidate base station. The stream $\tilde{r}_1$ can include as an enhanced signal component the downlink serving signal stream from base station 20A. The stream $\tilde{r}_2$, can include, as an enhanced signal component a scanning signal stream from a certain scanning base station, e.g., base station 20B. As set forth herein applique circuitry 1270 can compute Doppler shifts associated with detected base stations. According to one embodiment, applique circuitry 1270 can apply a frequency compensation equal to the negative of the Doppler shift associated with the corresponding base station. That is, to the signal stream $\tilde{r}_1$, applique circuitry 1270 can apply a frequency compensation equal to the negative of the Doppler shift associated with the serving base station while to the signal stream $\tilde{r}_2$, applique circuitry 1270 can apply a frequency compensation equal to the negative of the Doppler shift associated with a certain detected scanning base station. Next, applique circuitry 1270 combining the streams can form a sum of the frequency compensated versions of these two signal streams. Applique circuitry 1270 can feed the sum of the signal streams defined by the combined signal to down converter 1221 of transceiver 120 within COTS circuitry 1260 of transceiver 120 (FIG. 7). The sum can be an unweighted sum or a weighted sum. In some embodiments, applique circuitry 1270 can apply weights to the streams and the sum can be a weighted sum. The weights associated with the two streams may be proportional to or otherwise dependent on the received signal strengths associated with the serving base station and the desired scanning base station as measured by applique circuitry 1270. In another embodiment, another weighting scheme can be applied. Down converter 1221 in response to receipt of the combined signal can output a baseband frequency signal which can be fed to modem 1230 of COTs circuitry 1260 for demodulation and output of a digital bitstream.

Embodiments herein recognize that for COTS circuitry 1260, the received signal, i.e., the sum of frequency compensated RF signal streams can emulate the characteristics of a normal RF received signal from an antenna in an environment where substantial Doppler shifts are not observed. Accordingly, while the configuration of transceiver 120 of FIG. 10 provides for accurate detection of signal strength of a scanning base station transceiver 120, the configuration of FIG. 10 also facilitates use of COTS circuitry 1260 in combination with applique circuitry 1270.

With the transceiver 120 configured as shown in FIG. 10, the major signal components associated with current serving base station 20A and scanning base station 20B will be close to the network reference downlink center frequency; i.e. both of these signal components will ideally show close to zero Doppler shift. As a consequence, the normal operations of transceiver 120 will be unaffected while, at the same time, transceiver 120 will be able to measure the desired candidate base station's received signal strength accurately, which can facilitate timely handover decisions.

As shown in FIG. 10, embodiments herein can use multiple antenna processing to help the transceiver 120 measure the received signal strength (RSRP in terms used by LTE) associated with a scanning base station. In one embodiment, UE device 10A can be equipped with K transmit-receive antennas. Applique circuitry 1270 can be placed between these antennas and COTS circuitry 1260. On the downlink (DL) side, the UE device 10A can receive signals received by each of these antennas, process them as described and can feed an aggregate signal to COTS circuitry 1260. COTS circuitry 1260 can process this aggregate signal produced by applique circuitry 1270 using its standard logic in the same manner as if it received an aggregate signal directly from an antenna in a non-Doppler environment.

In an alternate form as shown in FIG. 11, instead of using applied beamforming weights to provide aggregate signal streams, $\tilde{r}_1$ and $\tilde{r}_2$, in which base station signal streams of respectively different base stations are enhanced, directional antennas having a primary direction based on mounting orientation can be used to form K directional sectors. According to one embodiment first and second directional antennas can be employed, one directed forward of the aircraft and one directed to the aft, e.g., $\tilde{r}_2$ could be received from forward facing antenna and $\tilde{r}_1$ could be received on the aft facing antenna. The embodiment of FIG. 11 has the advantage of being less computationally intensive as beamforming weights need not be calculated to separate the RF streams. A further advantage of this form is that due to the nature of flight, it is more likely than not that an aircraft carrying UE device 10A will be moving away from the target base station and towards the candidate base station. Thus, the probability of a scanning signal stream and a serving signal stream being respectively enhanced within first and second different aggregate signal streams is increased even in the basic case of UE device 10A having only two antennas. Further, although only the strongest base station in each sector is typically compensated for, other base stations in the same sector are likely to have similar Doppler shifts associated with them, which increases the chance of a successful handover from a serving base station to a scanning base station picked up by the same sector even if only one of the two can be compensated for. The embodiment of FIG. 11 otherwise behaves in the same manner as in the embodiment of FIG. 10.

Figure 9:
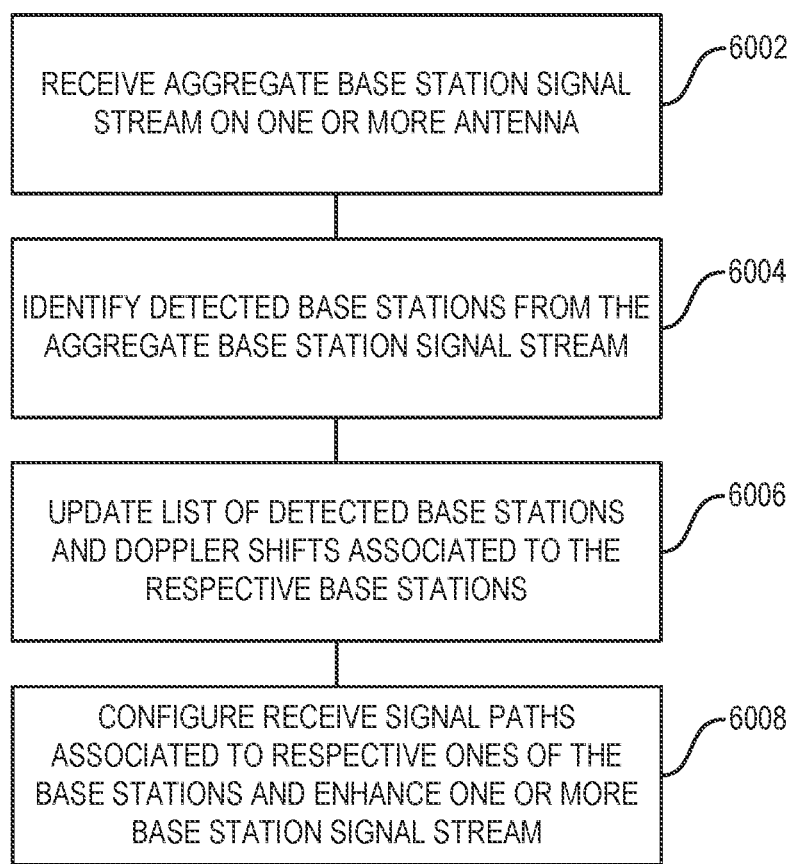
FIG. 9 is flowchart illustrating a method for performance by a UE device according to one embodiment.

Further aspects of the method of FIG. 9 according to one embodiment are now described. At block 6004, UE device 10A by applique circuitry 1270 can continuously search for synchronization signals transmitted by base stations within its range and tries to achieve synchronization with them. Acquiring synchronization with a base station enables applique circuitry 1270 to measure its received signal strength (i.e., RSRP), channel estimates for each of the K antennas, and, with use of the stable and accurate local oscillator signal provided by reference frequency generating device 1271, the Doppler shift associated with that base station. Synchronization signal processing for detection of a base station signal streams can be performed using an aggregate signal from any of the K antennas and/or an aggregate signal provided by a suitably weighted (beamformed) sum of the signals from the K antennas. Acquiring synchronization with a base station facilitates applique circuitry 1270 determining an identifier for a base station since different base stations can be configured to use different combinations of synchronization sequences.

Applique circuitry 1270 for processing of the described synchronization signals for recovery of base station identifiers, base station signal stream center frequencies and Doppler shifts, signal strength, and channel estimation information can process aggregate signals in one or more of the RF domain (pre-down conversion), base band domain (post-down conversion), or the digital domain (post de-modulation).

In one embodiment, down link signal processing circuit 1272 of applique circuitry 1270 can include a down converter and modem dedicated for demodulation of synchronization signal frames. However, the processing resources for provisioning the down converter and modem within downlink signal processing circuit 1272 of applique circuitry 1270 for recovery of information of a synchronization signal can be limited in comparison to the processing resources for provisioning of down converter 1221 and modem 1230 within COTS circuitry 1260. For example, the modem within downlink signal processing circuitry 1272 of applique circuitry 1270 can have resources to process a restricted set of frame types which include synchronization frames but which does not include a comprehensive set of frame types permitted by a communication standard. A down converter within downlink signal processing circuit 1272 of applique circuitry 1270 can include a roaming non-tracking down conversion local oscillator signal in order to configure downlink signal processing circuitry 1272 of applique circuitry 1270 to detect and demodulate base station signal streams across a wide range of Doppler shifted center frequencies. According to the described implementation, down conversion, acquiring synchronization, Doppler shift determination (which can occur as part of synchronization) and determination of beamforming weights can be performed on a time-shared basis wherein times for down conversion, acquiring synchronization, Doppler shift determination can be allocated to respective different scanning base stations on a time sharing basis.

Applique circuitry 1270 can store the signal strength (RSRP) and Doppler shift values in an repetitively updated data repository 180 as described in connection with Table (Table A) at block 6006 associated with identifiers for different base stations. Applique circuitry 1270 can repetitively perform the described processing and storing to generate time series datasets associated to different parameter values. From the corresponding time series datasets, applique circuitry 1270 can determine trends in signals strength values and Doppler shifts associated with them, and can return action decisions in dependence on the determined trends.

In another aspect, applique circuitry 1270 can keep track of the base station that transceiver 120 is in connected communication with and serving as the current serving base station. Applique circuitry 1270 can track the current serving base station by monitoring the uplink signals transmitted by COTS circuitry 1260 of transceiver 120 and detecting random access channel (RACH) transmissions. Embodiments herein recognize that different sets of RACH sequences are associated with different base stations. Accordingly, by identifying the RACH sequence being transmitted by COTS circuitry 1260, applique circuitry 1270 can determine an identifier of a base station that has been selected as a serving base station. Initially, i.e., before detecting any RACH transmissions, a current serving base station can be unknown. In this state, applique circuitry 1270 can treat the base station with the strongest received signal as the current serving base station.

According to one example at block 6004 transceiver 120 can identify detected base stations in detection range of transceiver 120. The detection of base station signals in communication range of transceiver 120 can include processing the aggregate base station signals received at block 6002. The processing at block 6004 can include signal processing for identification of signature base station signals received from a base station. In LTE and NR, base station signature signals can be provided by synchronization signals. Transceiver 120 identifying a synchronization signal can include transceiver 120 processing an aggregate RF signal received at one or more antenna 150. By transceiver 120 identifying a base station synchronization signal, transceiver 120 can record in data repository 180 a center frequency associated to the base station synchronization signal. With a synchronization signal identified, a center frequency can be identified. Transceiver 120 can be configured to store in data repository 180 information specifying the center frequency of each detected base station.

Transceiver 120 at block 6004 can be configured to compare center frequencies of received signals to a network reference center frequency using reference frequency generating device 1271 for detection of a Doppler shift associated to respective ones of the detected base stations. Thus, when transceiver 120 detects a base station signature signal, a Doppler shift associated to the detected base station downlink signal stream can also be detected.

Based on the identification of base station signature signals at block 6004, UE device 10A at block 6006 can update a list of base stations currently in communication range of UE device 10A, and at block 6006 can update a Doppler shift dataset that specifies Doppler shift parameter values associated to the various base station.

At block 6008, UE device 10A can perform configuring receive signal processing paths for the detected base stations at block 6006, and activating one or more enhancement to one to or more base station signal stream.

The configuring of receive signal paths can include, e.g., removing receive signal paths for base stations no longer detected, adding receive signal paths for newly detected base stations, or repeating the assignments of the most recent iteration if there are no changes. According to one embodiment UE device 10A can configure one receive signal path for each detected base station. According to one embodiment, UE device 10A can configure more than one receive signal path for each detected base station. According to one embodiment UE device 10A can configure signal paths for less than each detected base station detected to be in communication range of UE device 10A. According to one embodiment applique circuitry 1270 can configure a first receive signal path for the current serving base station and a second receive path for a highest ranking scanning base station that has been selected as the highest ranking scanning base station under criteria that includes signal strength and zero or more additional factors. Example configurations of signal paths responsive to detection of a base station signal stream are set forth with reference to the embodiment of FIG. 10. With respect to the embodiment of FIG. 10, applique circuitry 1270 can activate application of the described beamforming weights in response to detection of a first scanning signal stream, and in response to the detection of an additional scanning signal stream, the weights can be applied again to configure a third signal receive path propagating an aggregate signal in which the additional scanning signal stream is enhanced. There is set forth herein, in one embodiment, receiving, by a transceiver of a UE device an aggregate signal stream, the aggregate signal stream including an aggregate of base station downlink signal streams from a plurality of base stations; processing the aggregate signal stream and detecting, from the processing of the aggregate signal stream, a set of base stations in communication range of the UE device, wherein the set of base stations include a current serving base station and a scanning base station; determining, from the processing of the aggregate signal stream, a Doppler shifted center frequency of a downlink scanning signal stream received from the scanning base station; and enhancing, in dependence on the Doppler shifted center frequency, the downlink scanning signal stream associated to the scanning base station, wherein the enhancing includes frequency compensating the downlink scanning signal stream using a scanning base station Doppler shift parameter value that specifies an amount of a Doppler shift defined by the Doppler shifted center frequency and combining the frequency compensated scanning signal stream with a serving signal stream from the serving base station, wherein the set of base stations include the current serving base station, the scanning base station and a second scanning base station, and wherein the combining the frequency compensated scanning signal stream with a serving signal stream from the serving base station includes further combining the frequency compensated scanning signal stream with a second base station signal stream from the second scanning base station. The second base station signal stream can be frequency compensated or frequency un-compensated, weighted or unweighted.

Table A illustrates a control dataset that can be repetitively output by applique circuitry 1270 at block 6006.

TABLE A

| Detected Base Station (nB) | CSBS Status | Receive Signal Path Configuration | Detected Center Frequency (CF) of Associated Base Station Signal Stream | Detected Doppler Shift of Associated Base Station Signal Stream | Signal Strength | Down-Conversion LO Signal | Uplink Compensation |
|---|---|---|---|---|---|---|---|
| AAA 017(20A) | YES | A1 | XX | XX | XX | Matching of CF received downlink signal from 20A | XX |
| AAA 066(20B) | NO | A2 | XX | XX | XX | Matching of CF received downlink signal from 20B | XX |
| AAA 051(20Z) | NO | A3 | XX | XX | XX | Matching CF of received downlink signal from 20Z | XX |

Applique circuitry 1270 at block 6006 can timestamp each row of data depicted in Table A so that time series datasets are generated with iterations of block being performed. Applique circuitry 1270 at block 6008 using recorded Doppler shift values of Table A can apply one or more enhancement at block 6008 in addition to or in place of enhancing a scanning base station signal stream as described in connection with the embodiment of FIGS. 10 and 11.

At block 6008, applique circuitry 1270 can apply proactive Doppler frequency compensation to one or more transmitted uplink signal before passing the uplink signal to one or more antenna 150. Applique circuitry 1270 can be applying proactive Doppler compensation to a first base station operating in the role of the CSBS and can be repetitively monitoring transceiver 120 for transmissions to a different base station selected to operate in the role of the CSBS. For application of Doppler frequency compensation to an uplink signal stream transmitted at block 1002 (FIG. 8) to a certain base station, applique circuitry 1270 can apply a Doppler shift in dependence on the most recently detected Doppler shift associated to the certain base station. In the case of a TDD system, the amount of Doppler shift can be equal to and of opposite sign with respect to the detected Doppler shift. In the case of an FDD system, the amount of Doppler shift can be of opposite sign with respect to the detected Doppler shift but scaled based on the ratio of downlink to uplink center frequencies.

In one embodiment, UE device 10A at block 6008 can apply frequency compensation to an uplink base station signal stream in dependence on a detected Doppler shift of a received downlink scanning signal stream so that the uplink scanning signal stream is received at its base station with a center frequency at about the uplink network reference center frequency of the base station. For applying a frequency compensation to an uplink base station signal stream for a certain base station, UE device 10A can apply a frequency shift to an uplink signal stream of opposite sign relative to the detected Doppler shift of the corresponding downlink signal stream. The amount of the frequency shift can be in common with the amount of the detected Doppler shift in the case of the TDD system. In the case of an FDD system, the amount of the shift can be scaled according to the ratio of the center frequencies of the uplink and downlink signals. The transmitted uplink signal stream 221 as set forth in reference to FIG. 1 can be subject to application of a frequency compensation determined in dependence on the detected downlink Doppler shift of received downlink signal stream 212 so that the received uplink signal stream 222 received at a base station features a center frequency at about the network reference center frequency. By performance of such frequency compensation uplink scanning signal streams received by base station 20A can be expected to be within the detection range of base station 20A and will not be lost.

The amount of Doppler compensation provided to the transmitted uplink signal to a certain base station can be dependent on the Doppler shift associated with the certain base station. Applique circuitry 1270 can be configured to detect the current serving base station by monitoring RACH signals transmitted from transceiver 120, and can be configured to apply Doppler frequency compensation to the current CSBS. If applique circuitry 1270 has not encountered a RACH signal, the Doppler compensation can be selected to be in dependence on the Doppler shift associated with the strongest base station.

By estimating Doppler shifts from the downlink direction continuously, applique circuitry 1270 can apply negative Doppler compensation to each RACH transmission (and subsequent data transmissions) once a labeled RACH transmission has been identified. On the extraction of a base station identifier from monitoring for RACH signals, applique circuitry 1270 can look up the most recent Doppler shift parameter value for the identified base station stored in data repository 180 as described in connection with Table A and can use that Doppler shift parameter value for application of frequency compensation to the uplink signal stream sent at block 1002. The application of a frequency compensation to an uplink signal stream responsively to detection of a RACH signal using a previously obtained Doppler shift parameter value is expected to improve the convergence time to the correct Doppler shift for that base station. By the monitoring of RACH signals, applique circuitry 1270 can detect for the transition to a new base station being selected as the new CSBS.

There is set forth herein, according to one embodiment, processing an aggregate signal stream and detecting, from the processing of the aggregate signal stream, identifiers for a set of base stations in communication range of the UE device, and Doppler shift parameter values that specify Doppler shifts associated to respective base stations of the set of base stations, wherein the set of base stations include a current serving base station and a plurality of scanning base stations; storing into a data repository the identifiers for the set of base stations in communication range of the UE device, and associated to the identifiers for the set of base stations the Doppler shift parameter values that specify Doppler shifts associated to respective base stations of the set of base stations; monitoring an uplink signal stream transmitted by the transceiver; and in response to the monitoring the uplink signal stream extracting an identifier of a certain base station, and applying frequency compensation to the uplink signal stream with use of a Doppler shift parameter value stored in the data repository and associated to the certain base station.

In one embodiment, as indicated by optional send blocks 1003 and 1004 of the flowchart of FIG. 8 applique circuitry 1270 can apply Doppler compensation without monitoring the uplink RACH signal stream of UE device 10A and without determination of the base station operating as the CSSB. In such an embodiment, applique circuitry 1270 can monitor the K strongest base stations and can create bidirectional channels which can be referred to as channels $c_1, c_2, \ldots, c_K$ between each detected base station as summarized in Table A. In such an embodiment, transceiver 120 can send uplink transmission streams to ones of the detected scanning base stations as well as the current serving base stations. These channels can be created virtually via bidirectional beamforming if the system is TDD, or via the use of physical directional antennas as described above in both the TDD and Frequency Division Duplexing (FDD) cases. For each channel, applique circuitry 1270 can measure the Doppler shift of the strongest base station in the channel and can apply a proactive frequency compensation on the uplink based on the measured Downlink Doppler shift. For applying frequency compensation to the respective uplink signal streams for the respective base stations, applique circuitry 1270 can apply a frequency shift to an uplink signal stream of opposite sign relative to the detected Doppler shift of the corresponding downlink signal stream. The amount of frequency compensation can be equal to the amount of detected Doppler shift in the case of a TDD system, and in a FDD system can be scaled by the ratio of uplink to downlink center frequencies. In the described frequency compensation scheme involving use of channels $c_1, c_2, c_K$ identical packet information can be redundantly transmitted to multiple base stations at different base station addresses, with different Doppler compensations applied to the different uplink transitions, and the actual currently serving base station will process the uplink signal stream which it receives. The described frequency compensation scheme involving use of channels $c_1, c_2, c_K$ can further reduce any convergence delay associated to the described monitoring of a RACH signal stream.

In another aspect, beamforming techniques can be applied for compensating uplink transmissions in dependence on detected Doppler conditions. Referring again to the embodiment of FIG. 10 in the case of a Time Division Duplex (TDD) system, it can generally be assumed that the channel between a given base station and the UE device 10A are reciprocal. In this case, the beam forming vector calculated on the downlink transmission can be used to develop appropriate uplink beamforming weights b' for each monitored base station, e.g., $b'_1=[b'_{1,1}, b'_{1,2}, \ldots, b'_{1,K}]$. These weights can be applied to the uplink transmission of UE device 10A to enhance the received signal at a specific base station and to reduce interference to other base stations. For example, b' can be selected such that signal strength is maximized at the target base station while reducing interference to other base stations.

Applique circuitry 1270 can repetitively store the data of Table A into data repository 180 at block 6006 and can repetitively update such data with most recent values over time so that time series historical datasets across various parameters are stored in data repository 180. Applique circuitry 1270 can examine history data of data repository 180 responsively to a condition being satisfied for return of action decisions. According to one embodiment, applique circuitry 1270 can conditionally configure a receive signal path associated to a detected base station (for enhancing a signal stream associated to that base station) in response to a condition being satisfied. The condition can be e.g., the signal strength of the base station signal stream has remained above a threshold for a specified number of iterations.

There is set forth herein, in one embodiment, receiving, by a transceiver of a UE device an aggregate signal stream, the aggregate signal stream including an aggregate of base station downlink signal streams from a plurality of base stations; processing the aggregate signal stream and detecting, from the processing of the aggregate signal stream, a set of base stations in communication range of the UE device, wherein the set of base stations include a current serving base station and a scanning base station; determining, from the processing of the aggregate signal stream, a Doppler shifted center frequency of a downlink scanning signal stream received from the scanning base station; and enhancing, in dependence on the Doppler shifted center frequency, the downlink scanning signal stream associated to the scanning base station.

In connection with the embodiments of FIGS. 10 and 11, it was described that enhancing a base station signal stream using a detected scanning signal stream Doppler shift can include applying a frequency compensation to the scanning signal stream and combining the frequency compensated scanning signal stream with a frequency compensated serving signal stream. The combined streams can be input into a frequency down converter 1221 in transceiver 120 which frequency down converter 1221 can be located within COTS circuitry 1260 (FIG. 7). In connection with the embodiments of FIGS. 10 and 11, different receive signal paths can be configured for providing a scanning signal aggregate signal in which a scanning signal stream can be enhanced, and a serving signal aggregate signal in which a serving signal stream can be enhanced.

Figure 14:
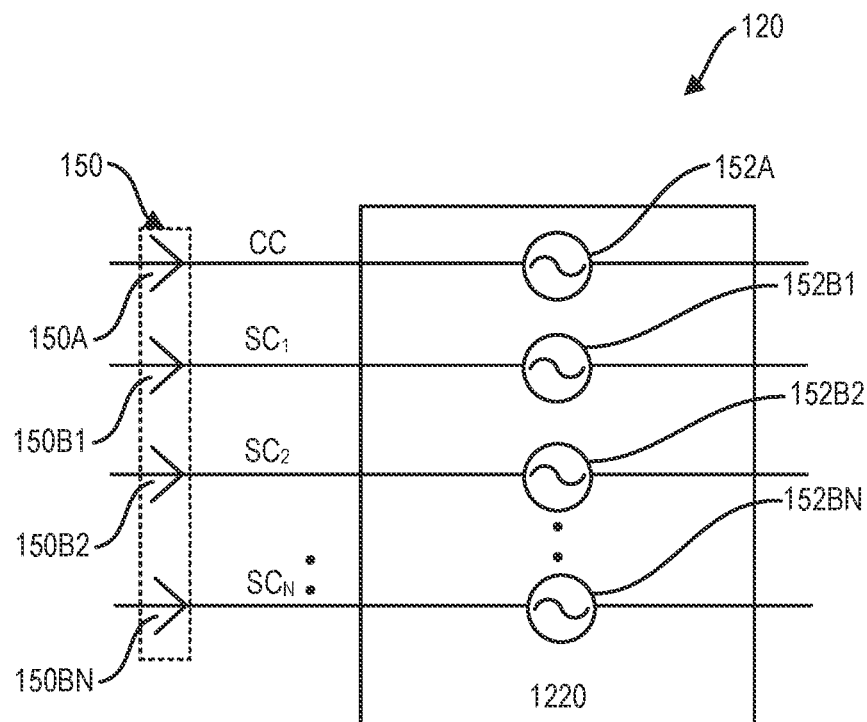
FIG. 14 is a schematic block diagram illustrating a transceiver according to one embodiment.

The embodiments of FIGS. 14-16 set forth an alternate method for enhancing a downlink scanning signal stream from a certain scanning base station using a detected Doppler shift for the identified certain scanning base station. In the embodiments of FIGS. 14-16, applique circuitry 1270 responsively to detection of a scanning signal stream associated to certain scanning base station can provide a separate tracking local oscillator signal for down conversion of the scanning signal stream from the certain base station. The separate tracking local oscillator signal for down conversion of the scanning signal stream from the certain base station can be separate from the tracking local oscillator signal for performing down conversion of the serving signal stream from the current serving base station 20A. In such manner, the problem of errors resulting from a center frequency of a scanning signal stream being too spaced apart in frequency from the serving signal stream can be avoided.

Figure 12:
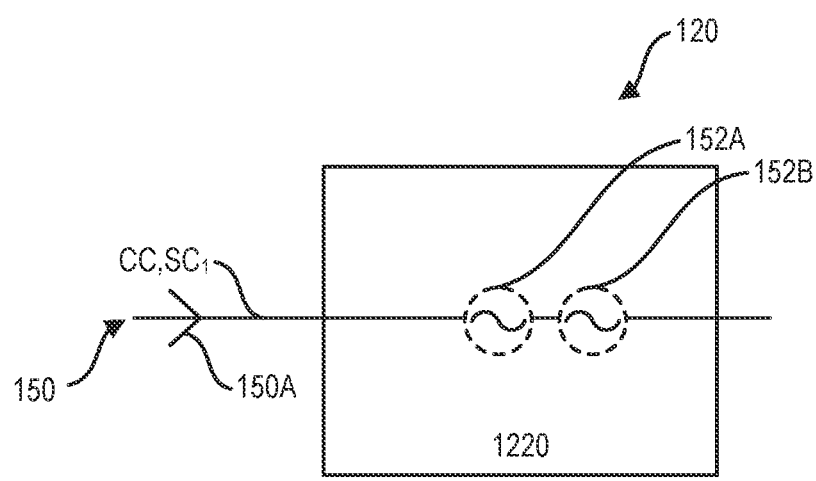
FIG. 12 is a schematic block diagram illustrating a transceiver according to one embodiment.

According to one scheme so that accurate downlink signal streams are received by UE device 10A from scanning base stations 20B-20Z, transceiver 120 of UE device 10A as shown in FIG. 12 can include a single physical receive signal path defined by single antenna 150A optimized for receiving the aggregate signal comprising connected communication signals, CC, from connected current serving base station 20A as well as scanning communication signals as SC1 to SCN from scanning base stations 20B-20Z which are candidate next serving base stations. With respect to the embodiment of FIG. 12, multiple logical receive paths can be provided by time division. In the embodiment of FIG. 12 transceiver 120 can include tracking local oscillator signal 152A for performance of down conversion of the aggregate signal comprising respective connected communication serving signal stream CC and local oscillator signal 152B for performance of down conversion of scanning communication signal scanning signal stream SC1 from a certain base station. The different tracking local oscillator signals can be active at different times. Local oscillator signal 152A can track a center frequency of the connected communication serving signal stream CC. Local oscillator signal 152B can track a center frequency of a scanning base station. In the embodiment of FIG. 12 transceiver 120 can be configured to provide dedicated time windows for the sensing, down conversion, and demodulation of a connected communication serving signal stream CC and scanning communication signal scanning signal stream SC1 from a certain base station. During serving time windows, transceiver 120 can configure serving local oscillator signal 152A to be active. During the scanning time windows, transceiver 120 can configure scanning local oscillator signal 152B to be active. With respect to the embodiment of FIG. 12, additional time windows can be provided for in which additional tracking local oscillator signals can be active for down conversion of additional scanning signal streams. Tracking local oscillator signals herein can dynamically track for matching a changing center frequency of a base station signal stream. A down conversion local oscillator signal that matches a base station signal stream center frequency optimizes down conversion signal recovery of the base station signal stream.

Figure 13:
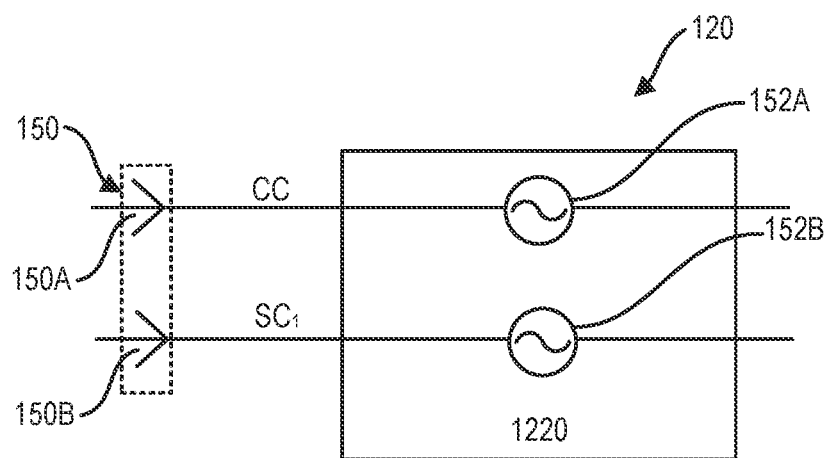
FIG. 13 is a schematic block diagram illustrating a transceiver according to one embodiment.

Referring to the embodiment of FIG. 13, transceiver 120 can be configured to receive accurate downlink signal streams from scanning base stations 20B-20Z by providing differentiated receive signal paths for reception of connected communication signals from a connected current serving base station 20A and multiple scanning base stations 20B-20Z. In the embodiment of FIG. 13, transceiver 120 can be connected to antenna 150A defining a first downlink receive signal path for enhancement within an aggregate signal downlink serving signal stream CC from a current serving base station 20A and can include a second dedicated antenna 150B defining a second receive path for enhancing in an aggregate signal scanning signal stream from scanning base station 20B.

In the embodiment of FIG. 13, tracking local oscillator signal 152A can be associated to the first downlink signal stream provided by the serving signal stream, and tracking local oscillator signal 152B can be associated to the second downlink signal stream comprising scanning signal streams SC1 from scanning base station 20B. Local oscillator signal 152A for down conversion of serving signal stream CC can be controlled to track Doppler shifted received downlink signal stream 212. Tracking Local oscillator signal 152B in the embodiment of FIG. 12 can track to match and optimize recovery for scanning signal stream SC1 from scanning base station 20B. In a variation of the embodiment of FIG. 13, the depicted scanning signal stream receive path can be configured for time division so that additional tracking local oscillator signals for optimizing down conversion of additional scanning signal streams are active at different times.

In the embodiment of FIG. 14, transceiver 120 can be configured to include first antenna 150A a defining a first receive signal path for enhancing reception of a scanning signal stream received from current serving base station 20A and can also include separate antennas 150B1, 150B2, 150BZ defining separate receive signal paths for enhancing reception of signals from respective ones of scanning base stations 20B-20Z. In the embodiment of FIG. 14, a downlink receive signal path defined by antenna 150A can enhance a serving signal stream CC from the current serving base station 20A. In the embodiment of FIG. 14, a receive signal path defined by antenna 150B1 can be configured to enhance scanning signal stream SC1 from scanning base station 20B, the receive signal path defined by antenna 150B2 can be configured to enhance scanning signal stream SC2 from base station 20C (not shown), and the receive signal path defined by antenna 150BN can be configured to enhance a scanning signal stream SCN from scanning base station 20Z.

The described differentiated receive signal paths of the embodiment of FIG. 14 can include differentiated down conversion controlling tracking local oscillator signals as indicated in FIG. 14, namely tracking local oscillator signal 152A, tracking local oscillator signal 152B1, tracking local oscillator signal 152B2, and tracking local oscillator signal 152BN. Local oscillator signal 152A can be controlled to track the Doppler shifted received downlink signal stream 212 (FIG. 1) while the remaining local oscillator signals 152B1-152BN and can be controlled to track the respective Doppler shifts (Table A) recorded with respect to the various respective scanning base stations. In the embodiments of FIGS. 12-14 aggregated base station signal stream can be received on the antennas defining the different respective receive paths with the different tracking down conversion local oscillator signals enhancing one of the base station signal stream. In FIGS. 13 and 14, antennas are depicted separated between receive paths. However, a common set of antennas can alternatively be shared between receive paths as depicted in FIG. 10, e.g., with use of beamforming techniques. As explained with reference to the embodiments of FIGS. 10 and 11, enhancing a scanning signal stream so that the downlink scanning signal stream can be accurately measured can include combining a frequency compensated scanning stream of a scanning receive signal path, with a frequency compensated serving stream of a second receive signal path, wherein a scanning receive signal path is configured for enhancing a downlink scanning signal stream from the scanning base station, and wherein a serving receive signal path is configured for enhancing a downlink serving signal stream from the serving base station. As explained with reference to the embodiments of FIGS. 12-14, enhancing a scanning signal stream so that the downlink scanning signal stream can be accurately measured can include down converting a downlink scanning signal stream received from the scanning base station using a local oscillator signal that varies in dependence on changes of a center frequency of the downlink scanning signal stream. Down converted signals described in the embodiments of FIGS. 12-14, can be fed into modem 1230 for demodulation.

Based on the identification of base station signature signals at block 6004, UE device 10A at block 6006 can update a list of base stations currently in communication range of UE device 10A. At block 6006, UE device 10A can perform assigning receive signal processing paths for the detected base stations at block 6006. The assigning can include dynamically dropping receive signal paths for base stations no longer detected, adding receive signal paths for newly detected base stations, or repeating the assignments of the most recent iteration if there are no changes. Referring to FIG. 10, applique circuitry 1270 responsively to detecting a new base station, can calculate and apply beamforming weights to define a new receive path for the new base station, and conversely eliminate a receive path if the base station associated to the scanning signal receive path is no longer detected.

In one embodiment, applique circuitry 1270 can be configured to return action decisions in response to examination of historical data stored in data repository 180. The historical data can include time series data defined by collections of the dataset of Table A over time. Action decisions can include action decisions to generate or remove base station associated receive signal paths of transceiver 120, e.g., by providing different receive signal paths for enhancement of a scanning signal stream as described in connection with the circuits of FIGS. 10-15. In some embodiments, a scanning base station can be detected by a UE device 10A but UE device UEA can refrain from generating a dedicated receive signal path for that detected base station unless one or more condition is observed. It should be noted that scanning signal streams in any case (without a dedicated receive signal path) can still be down converted and demodulated given that it can be carried as a component of an aggregate base station signal that is passed to a down converted and demodulator. For return of action decisions, applique circuitry 1270 can use a decision table decision data structure as shown in Table B.

TABLE B

| Row | Condition 1 | Condition 2 | Condition 3 | Action Decision |
|---|---|---|---|---|
| 1 | No dedicated receive signal path is currently active for base station 01 | Signal strength for stream from base station 01 has remained above threshold Y for longer than time threshold t1 | Doppler shift for stream from base station 01 has declined for longer than time threshold t2 | Generate receive signal path for enhancing stream from detected base station 01 |
| 2 | No dedicated receive signal path is currently active for base station 01 | Signal strength for stream from base station 01 has remained above threshold Z for longer than time threshold t3 | — | Generate receive signal path for enhancing stream from detected base station 01 |
| 3 | Dedicated receive signal path is currently active for base station 01 | Signal strength for stream from base station 01 has remained below threshold A for longer than time threshold t4 | Doppler shift for stream from base station 01 has increased for longer than time threshold t2 | Remove receive signal path for enhancing stream from detected base station 01 |
| 4 | Dedicated receive signal path is currently active for base station 01 | Doppler shift for stream from base station 01 has increased above threshold B | — | Remove receive signal path for enhancing stream from detected base station 01 |
| 5 | No dedicated receive signal path is currently active for base station 01 | A center frequency (Cf) spacing between a signal stream for base station 01 and the serving signal stream is less than a spacing threshold C | — | Refrain from generating a receive signal path for enhancing stream from detected base station 01 |
| 6 | No dedicated receive signal path is currently active for base station 01 | Signal strength for stream from base station 01 has remained above threshold D for longer than time threshold t1 | Doppler shift for stream from base station 01 has declined for longer than time threshold t5 | Generate receive signal path for enhancing stream from detected base station 01 |

TABLE B-continued

| Row | Condition 1 | Condition 2 | Condition 3 | Action Decision |
| --- | --- | --- | --- | --- |
| 7 | Dedicated receive signal path is currently active for base station 01 | Signal strength for stream from base station 01 has remained below threshold E for longer than time threshold t6 | Doppler shift for stream from base station 01 has increased for longer than time threshold t7 | Remove receive signal path for enhancing stream from detected base station 01 |

As noted in Table B, applique circuitry 1270 can be configured to generate and remove receive signal paths associated to certain scanning base stations responsively to examination of historical signal strength time series data stored in data repository 180. As noted in Table B, applique circuitry 1270 can be configured to generate and remove receive signal paths associated to certain scanning base stations responsively to examination of historical Doppler shift time series data stored in data repository 180. In some embodiments, a scanning base station can be detected by a UE device 10A but LIE device 10A can refrain from generating a dedicated receive signal path for that detected base station unless one or more condition is observed. As seen from Row 5, applique circuitry 1270 according to one embodiment can refrain from generating a receive signal path for a certain scanning signal stream and a serving signal stream unless a center frequency spacing between the certain scanning signal stream and the serving signal stream satisfies a threshold.

At block 1005, UE device 10A can perform various processing. The various processing can be performed by signal processing circuit 140 of UE device 10A. At processing block 1005, UE device 10A by processing circuit 140 can generate a plurality of parameters useful for return of action decisions. The action decision at block 1006 can be an action decision for selection of the next serving base station. An action decision for selection of a next serving base station, according to one embodiment, can include an action decision specifying that UE device 10A send dataset data for examination by manager system 310. An action decision for selection of a next serving base station, according to one embodiment, can include an action decision specifying that UE device 10A send to manager system 310 a request that identifies a certain scanning base station as a requested next serving base station. An action decision for selection of a next serving base station, according to one embodiment, can include an action decision to select a certain scanning base station as a next serving base station and specifying that UE device 10A send a request to manager system 310 that identifies the certain scanning base station as a requested next serving base station.

At block 1005, UE device 10A according to one embodiment can generate additional time series data from datasets data as described in connection with Table A. In connection with Table A, it was described that detecting Doppler shift parameter values for respective base stations can include comparing a detected center frequency of a downlink signal stream to a network reference center frequency with use of reference frequency generating device 1271. In another aspect, UE device 10A can calculate Doppler shift parameter values with use of time series signal strength parameter values. According to one embodiment, time stamped signal strength parameter values associated to a plurality of detected base stations can be subject to processing using triangulation principles, and time stamped coordinate location values for UE device 10A can be extracted based on the processing by triangulation. The processing can be repeated by UE device 10A over time for generating time series coordinate location data that specifies time stamped coordinate locations of UE device 10A over time. From the time series coordinate location data, time series time stamped velocity parameter values, Heading parameter values, and Doppler shift parameter values can be extracted.

According to one embodiment velocity of UE device 10A at time t can be obtained by UE device 10A by dividing the distance traversed between the previous two location estimates by the difference in the corresponding reporting times. Assuming that the velocity of UE device 10A remains constant between times t and t+τ, it also gives an estimate of the velocity of UE device 10A at time t+τ as well. The direction of the velocity of UE device 10A can be given by the direction of growth for the predicted flight-path at time t+τ. With the estimated magnitude (velocity) and the direction of the velocity of UE device, a complete characterization of the latter velocity is provided. Using this velocity estimate, the Doppler shift that signals received by UE device 10A from each of a detected set of base stations are likely to experience can be provided. The Doppler shift for a base station can be computed by UE device 10A by projecting the predicted velocity along the position vector between that base station and the predicted location of UE device 10A, dividing it by the speed of light and multiplying the result by the carrier frequency. Also, given the predicted location of UE device 10A at time t+τ and the coverage maps of each of the base stations on a detected base station list, there can be computed an estimate of signal strength associated with each of those base stations at time t+τ. Thus, at this stage there can be provided for each base station on a detected base station list, an estimate of the SINR and the Doppler shift UE device 10A is likely to experience if it is handed over to that base station.

Embodiments herein recognize that the Doppler shift between a base station and UE device 10A can be in dependence on a spatial relationship between the base station and UE device 10A. Accordingly location and direction information of UE device 10A can be used as a measurement of Doppler shift. For example, a perpendicularity dissimilarity score for a location and direction of UE device 10A in respect to a plurality of candidate base stations can be examined and used as a surrogate measurement of Doppler shift. Embodiments herein recognize that locations and directions that are more perpendicular in respect to a base station tend to produce smaller Doppler shifts. In the case of a mobile UE device 10A carried by an aircraft, an aircraft Heading parameter can be used for the providing of a perpendicularity dissimilarity score. In one embodiment, UE device 10A can determine a perpendicularity dissimilarity score based on a measurement of a first angle, wherein the first angle is the angle between the Heading parameter for the UE device 10A and a scanning base station. Determining a Doppler shift parameter for a UE device 10A to base station connection can include in one embodiment determining a perpendicularity dissimilarity parameter. Embodiments herein recognize that a Doppler shift for UE device 10A to base station connection can be in dependence on perpendicularity, with lower perpendicular dissimilarities being indicative of smaller Doppler shifts. UE device 10A can use a Heading parameter for providing of a perpendicularity dissimilarity score. UE device 10A can determine a perpendicularity dissimilarity score based on a measurement of a first angle and can select a candidate base station for initiating connection based on the measurement of a first angle, wherein the first angle is the angle between the Heading parameter for the UE device 10A (the direction in which the UE device 10A is traveling) and the candidate base station (the vector pointing from the candidate base station to UE device 10A). The closer the described first angle is to 90 degrees, i.e. when these two vectors are nearly perpendicular, its cosine is close to zero. Thus, the perpendicular dissimilarity score will be low with detected Doppler shift correspondingly low.

UE device 10A at block 1005 can update data repository 180 to include additional time series parameter values as indicated in Table C. Such parameter values can include, e.g., Doppler shift parameter values determined using multiple methods as set forth herein, signal strength parameter values, location parameter values, velocity parameter values, and Heading parameter values.

ined for generating predictions as to subsequent time parameter values. Examining of historical time series parameter values can include training a predictive model using data of a time series dataset and querying the predictive model on being trained.

Embodiments herein recognize that with increasing amount of Doppler shift associated to a base station of base stations 20A-20B communications to the base station can be more challenging. Accordingly, values can be assigned under factor F1 so that assigned values are inversely proportional predicted Doppler shift for a base station being subject to evaluation. In another aspect, values can be assigned under factor F2 so that assigned values are proportional to predicted signal strength for a base station being subject to evaluation. In one embodiment, UE device 10A can perform scoring using Eq. 1. In another embodiment, UE device 10A can send parameter values to manager system 310 of the described ground based computing system and manager system 110 of the ground based computing system can perform scoring.

As explained with reference to FIGS. 15 and 16, predictive models can be employed by UE device 10A to predict Doppler shift and signal strength at a subsequent future time. Predictive models can be trained with use of historical time series parameter values. Predictive model 3100 shown in FIG. 15 illustrates a predictive model for predicting Doppler shift associated to base stations 20A-20Z at a future time.

TABLE C

| Time stamp | nB 10A Doppler shift | Signal strength | nB 10A Location | nB 10A Velocity | nB 10A Heading | ... | nB 10Z Doppler shift | Signal strength | nB 10Z Location | nB 10Z Velocity | nB 10Z Heading |
|---|---|---|---|---|---|---|---|---|---|---|---|
| T1 | XX | XX | XX | XX | XX | ... | XX | XX | XX | XX | XX |
| T2 | XX | XX | XX | XX | XX | ... | XX | XX | XX | XX | XX |
| T3 | XX | XX | XX | XX | XX | ... | XX | XX | XX | XX | XX |
| ... | ... | | ... | ... | ... | ... | ... | | ... | ... | ... |

UE device 10A at action decision block 1006 can examine various parameter values determined by processing at block 1005. At action decision block 1006 according to one embodiment, UE device 10A can score a set of detected base stations including the current serving base station 20A for readiness to serve as the current serving base station. For such determination at block 1006 UE device 1110A can apply the formula Eq. 1.

$$S = F_1 W_1 + F_2 W_2 \quad (\text{Eq. 1})$$

Where $F_1$ is a first factor, $F_2$ is a second factor, and $W_1$-$W_2$ are weights associated to the first and second factors, respectively. Respective base stations in detection range of UE device 10A can be scored and ranked using Eq. 1 and selecting of a next serving base station can be dependent on the scoring. In one embodiment a next serving base station can be selected on the basis of which detected base station produced the highest score on evaluation using Eq. 1. According to one embodiment, the first factor can be a predicted Doppler shift factor that specifies a predicted subsequent time Doppler shift for a base station being evaluated, and the second factor can be a predicted signal strength factor that specifies a predicted subsequent time signal strength for a base station being evaluated. In one embodiment, current (most recent) Doppler shift and/or signal strength parameter values can be taken to specify a prediction as to the parameter values at a subsequent time. In another embodiment, time series datasets can be exam- Predictive model 3100 can be trained with training data. Once trained, predictive model 3100 is able to respond to query data. Training data for training predictive model 3100 can include combinations of Doppler shift parameter values over successive time periods. Predictive model 3100 modeling a particular base station's Doppler shift behavior can be subject to training with use of repetitively applied sets of training data, wherein each set of training data comprises (a) Doppler shift parameter value of the certain base station a certain time, t=T0 in combination with Doppler shift of the described certain base station at a successive time t=T0+1. The described training data can be applied for multiple iterations, wherein for each iteration time is advanced. UE device 10A can provide an instance of predictive model 3100 for each base station within radio communication environment 100 which has communicated with UE device 10A. Once trained, predictive model 3100 is able to respond to query data. Query data can comprise a Doppler shift parameter value for the certain base station at the current time, t=C. In response to the described query data, predictive model 3100 can output an output value. The output value can be the predicted Doppler shift for the certain base station at time t=C+1. FIG. 16 illustrates predictive model 3200 for predicting signal strength associated to a certain base station of the future time. Predictive model 3200 can be trained with training data. Once trained, predictive model 3200 is able to respond to query data. Training data for training predictive model 3200 can include combinations of signal strength values over successive time periods. Predictive model 3200 modeling a certain base station's signal strength behavior can be subject to training with use of repetitively applied sets of training data, wherein each set of training data comprises (a) signal strength parameter value of the certain base station a certain time, t=T0 in combination with signal strength of the described certain base station at a successive time t=T0+1. The described training data can be applied for multiple iterations, wherein for each iteration time is advanced. UE device 10A can provide an instance of predictive model 3200 for each base station within radio communication environment 100 which has communicated with UE device 10A. Once trained, predictive model 3200 is able to respond to query data. Query data can comprise a signal strength parameter value for the certain base station at the current time, t=C. In response to the described query data, predictive model 3200 can output an output value. The output value can be the predicted signal strength for the certain base station at time t=C+1.

The training data for training predictive model 3100 and predictive model 3200 can include additional or alternative data. With respect to predictive model 3100, sets of training data can include, in addition to Doppler shift parameter values of successive time periods, Heading parameter values in successive time periods and/or signal strength parameter values in successive time periods. Additional training data for training predictive model 3200 can include, e.g., Heading parameter values in successive time periods and/or Doppler shift parameter values in successive time periods. The sets of training data for training predictive model 3100 and/or predictive model 3200 can include an expanded set of successive time periods. Rather than including first and second time periods the sets of training data can include, e.g., first to Nth successive time periods.

Figure 17:
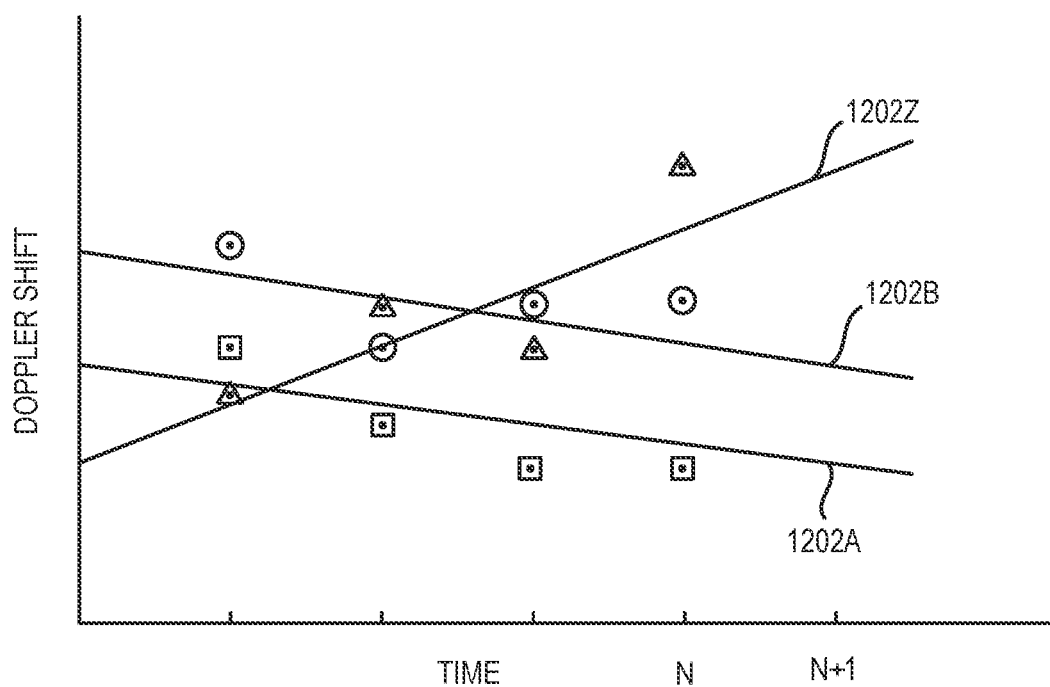
FIG. 17 is a diagram illustrating a predictive model trained by machine learning according to one embodiment.
Figure 18:
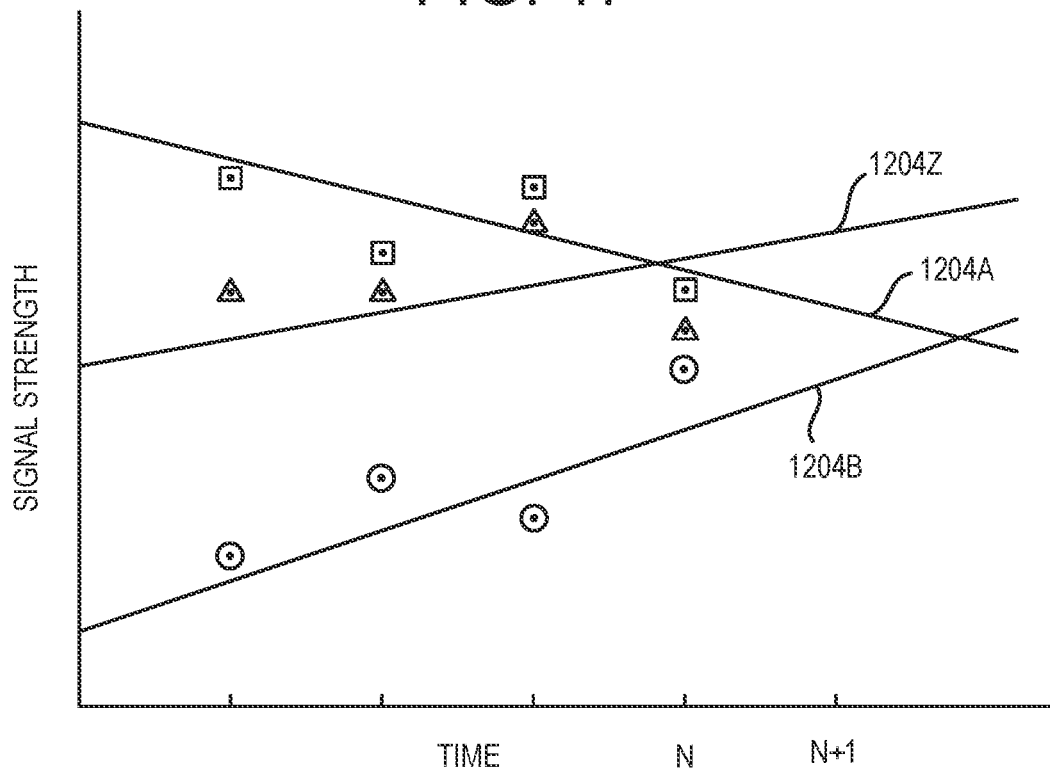
FIG. 18 is a diagram illustrating a predictive model trained by machine learning according to one embodiment.

Various available tools, libraries, and/or services can be utilized for implementation of predictive model 3100 and/or predictive model 3200. For example, a machine learning service can provide access to libraries and executable code for support of machine learning functions. A machine learning service can provide access set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. According to one possible implementation, a machine learning service can provide access to libraries and a set of REST APIs that can be called from any programming language and that permit the integration of predictive analytics into any application. Enabled REST APIs can provide, e.g. retrieval of metadata for a given predictive model, deployment of models and management of deployed models, online deployment, scoring, batch deployment, stream deployment, monitoring and retraining deployed models. Predictive model 3100 and/or predictive model 3200 can include use of, e.g., linear regression, curve fitting tools, support vector machines (SVM), Bayesian networks, neural networks and/or other machine learning technologies. Illustrative examples of predictive model 3100 and predictive model 3200 implemented with use of linear regression methods are described with reference to FIGS. 17 and 18. Predictions as to subsequent Doppler shift parameter values (FIG. 17) at time N+1 and subsequent future signal strength parameter values (FIG. 18) at time N+1 are described with reference to FIGS. 17 and 18. Regression lines 1202A-1202Z (FIG. 17) for predicting future Doppler shift parameter values associated to base stations 20A-20Z (FIG. 1) can be repetitively be redrawn based on most recently applied training data which comprises the most recently available Doppler shift parameter values, time stamped according to time N. Regression lines 1204A-1204Z (FIG. 18) for predicting future signal strength parameter values associated to base stations 20A-20Z (FIG. 1) can be repetitively redrawn based on most recently applied training data which comprises the most recently available Doppler shift parameter values, time stamped according to time N. As new training data is applied that is associated to time N+1, the described regression lines can be redrawn to generate new predictions for time N+2.

UE device 10A at block 1007 according to one embodiment can send handover request data defining a handover request to manager system 310 via base station 20A which can relay the request to manager system 310 at block 2202. The handover request can specify a certain scanning base station as a next serving base station. Responsively to receipt of the handover request data sent by UE at block 1007, manager system 310 at block 1101 can return an action decision at action decision block 1101 to approve or disapprove the handover request sent at block 1007.

Manager system 310 at block 1101 can decide whether a handover triggering condition has been satisfied. If a handover triggering condition has been satisfied, manager system 310 can initiate a handover to a selected next serving base station (NSBS). Manager system 310 at block 1102 for initiating a handover on approval of the handover request at block 1101 can send handover directing data to the selected next serving base station (NSBS) 20B. Base station 20B at block 2202 on confirmation of its readiness can responsively send handover directing data to base station 20A (the CSBS). The handover directing data sent at block 2202 by base station 20B can include NSBS identifier data specifying an identification for base station 20B selected as the NSBS.

In response to receipt of handover directive data including the NSBS identifier transmitted at block 2202, the CSBS 20A can perform a handover procedure including sending of handover directing data including the NSBS identifier at block 2103 to UE device 10A resulting in UE device 10A terminating its connection with the CSBS 20A and establishing a connection with a next serving base station (NSBS). The NSBS 20B at connect block 2203 and UE device 10A at block 1008 can engage in communications to facilitate a connection therebetween. In an alternate embodiment, manager system 310 for initiating handover at block 1102 can send handover directing data to base station 20A (the CSBS) with NSBS identifier data. Base station 20A on receipt of the handover directing data from manager system 310 can responsively send a communication to base station 20B (the selected NSBS) so that base station 20B can confirm its readiness and in response to a readiness confirmation communication from base station 20B, base station 20A can perform block 2103 in the manner described to send handover directing data including the NSBS identifier to UE device 10A resulting in UE device 10A terminating its connection with the CSBS 20A and establishing a connection with a next serving base station (NSBS).

In response to successful connection at block 2203 and block 1008, the status of the NSBS can transition to CSBS and UE device 10A can proceed to 1009. At block 1009, UE device 10A can determine whether a current session has ended. At block 1009 UE device 10A can return to a stage prior to block 1001 wherein UE device 10A is repetitively receiving and processing downlink signal stream reference signals from a plurality of base stations 20A-20Z. In response to completion of a connection at blocks 1008 and 2203, the NSBS (transitioned to CSBS) can send to UE device 10A an updated list of base stations, the updated list of base stations being base stations that neighbor the newly transitioned CSBS rather than the prior CSBS. At block 1001 in response to a handover between base stations completed, UE device 10A can process reference signals sent by all base stations in its range including the base stations specified in the updated list of base stations.

UE device 10A at block 1009 may determine that a current session has ended when UE device 10A is no longer airborne. For as long as UE device 10A at block 1009 determines that a current session has not ended UE device 10A can repetitively perform the loop of blocks 1001 to 1009. When a handover has occurred UE device 10A at block 1001 will receive downlink signal connection communication signal stream from the new current serving base station and at block 1004 will send compensated uplink signal connected communication stream to the new current serving base station.

It will be understood that action decision at block 1006 at which UE device 10A can decide to send request data specifying a request to initiate handover to selected certain scanning base station as a serving base station can be a conditional action decision that is conditional on a one or more criterion being satisfied. UE device 10A can perform multiple iterations of the loop of blocks 1001 to blocks 1009 without deciding to send handover request data.

In another embodiment action decision at block 1006 can be an action decision to send reporting data to ground-based computer system comprising base stations 20A-20Z and manager system 310. In such an embodiment, UE device 10A can decide to send reporting data upon the occurrence of one or more criterion. The one or more criterion can be the criterion indicating that conditions may be present that warrant handover. Where UE device 10A decides to send reporting data, reporting data can include time series datasets as described in connection with Table A and Table C.

When reporting data is sent to manager system 310 via base station 20A at block 1007, base station 20A at block 2102 can responsively relay the reporting data for receipt by manager system 310, which can process the reporting data at block 1101. The processing by manager system 310 at block 1101 can include the processing described with reference to UE device 10A performed as described in reference to block 1005 and block 1006. The processing by manager system 310 at block 1101 can include, e.g., use of Eq. 1 for selection of a next serving base station.

UE device 10A and/or manager system 310 can apply Eq. 1 using dataset data such as dataset data described with reference to Table A and/or Table C. There is set forth herein receiving, by a transceiver of a UE device, an aggregate signal stream, the aggregate signal stream including an aggregate of base station downlink signal streams from a plurality of base stations; processing the aggregate signal stream and detecting, from the processing of the aggregate signal stream, identifiers for a set of base stations in communication range of the UE device, and Doppler shift parameter values that specify Doppler shifts associated to respective base stations of the set of base stations, wherein the set of base stations include a current serving base station and one or more scanning base station; storing into a data repository the identifiers for the set of base stations in communication range of the UE device, and Doppler shift parameter values that specify Doppler shifts associated to respective base stations of the set of base stations so that there are recorded within the data repository Doppler shift datasets, the Doppler shift datasets associating to identifiers for respective base stations of the set of base stations Doppler shift parameter values; and transmitting by the transceiver of a UE device, an uplink signal stream to a certain scanning base station of the one or more scanning base station that has been selected as a serving base station, wherein selection of the certain scanning base station as a serving base station has included an examination of data of the Doppler shift datasets. There is set forth herein receiving, by a transceiver of a UE device, an aggregate signal stream, the aggregate signal stream including an aggregate of base station downlink signal streams from a plurality of base stations; processing the aggregate signal stream and detecting, from the processing of the aggregate signal stream, identifiers for a set of base stations in communication range of the UE device, and signal strength parameter values that specify signal strength associated to respective base stations of the set of base stations, wherein the set of base stations include a current serving base station and one or more scanning base station; storing into a data repository the identifiers for the set of base stations in communication range of the UE device, and signal strength parameter values that specify signal strength associated to respective base stations of the set of base stations so that there are recorded within the data repository signal strength datasets, the signal strength datasets associating to identifiers for respective base stations of the set of signal strength parameter values; repetitively performing the processing and the storing so that there are recorded within the data repository signal strength time series datasets, the signal strength time series datasets associating to identifiers for respective base stations of the set of base station signal strength parameter values over time; transmitting, by the transceiver of a UE device, an uplink signal stream to a certain scanning base station of the one or more scanning base station that has been selected as a serving base station, wherein selection of the certain scanning base station as a serving base station has included an examination of data of the signal strength time series datasets.

This written description uses examples to disclose the subject matter, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Among the methods and systems set forth herein there is set forth herein as follows: A1. A method comprising: receiving, by a transceiver of a UE device an aggregate signal stream, the aggregate signal stream including an aggregate of base station downlink signal streams from a plurality of base stations; processing the aggregate signal stream and detecting, from the processing of the aggregate signal stream, a set of base stations in communication range of the UE device, wherein the set of base stations include a current serving base station and a scanning base station; determining, from the processing of the aggregate signal stream, a Doppler shifted center frequency of a downlink scanning signal stream received from the scanning base station; and enhancing, in dependence on the Doppler shifted center frequency, the downlink scanning signal stream associated to the scanning base station. A2. The method of A1, wherein the enhancing includes frequency compensating the downlink scanning signal stream using a scanning base station Doppler shift parameter value that specifies an amount of a Doppler shift defined by the Doppler shifted center frequency and combining the frequency compensated scanning signal stream with a serving signal stream from the serving base station. A3. The method of A1, wherein the enhancing includes frequency compensating the downlink scanning signal stream using a scanning base station Doppler shift parameter value that specifies an amount of a Doppler shift defined by the Doppler shifted center frequency and combining the frequency compensated scanning signal stream with a serving signal stream from the serving base station, wherein the serving signal stream from the serving base station is a frequency compensated serving signal stream from the serving base station. A4. The method of A3, wherein the set of base stations include the current serving base station, the scanning base station and a second scanning base station, wherein the combining the frequency compensated scanning signal stream with a serving signal stream from the serving base station includes further combining the frequency compensated scanning signal stream with a second base station signal stream from the second scanning base station. A5. The method of A1, wherein the enhancing includes frequency compensating the downlink scanning signal stream using a scanning base station Doppler shift parameter value that specifies an amount of a Doppler shift defined by the Doppler shifted center frequency and combining the frequency compensated scanning signal stream with a frequency compensated serving signal stream from the serving base station, wherein the combining includes weighting the scanning signal stream and combining the weighted and frequency compensated scanning signal stream from the scanning base station with a weighted and frequency compensated serving signal stream from the serving base station. A6. The method of A1, wherein the enhancing includes frequency compensating the downlink scanning signal stream using a scanning base station Doppler shift parameter value that specifies an amount of a Doppler shift defined by the Doppler shifted center frequency and combining the frequency compensated scanning signal stream with a frequency compensated serving signal stream from the serving base station, and wherein the method includes presenting the combined signal to a down converter of the transceiver that includes a down conversion local oscillator signal matched to a network reference center frequency. A7. The method of A1, wherein the enhancing includes frequency compensating the downlink scanning signal stream using a scanning base station Doppler shift parameter value that specifies an amount of a Doppler shift defined by the Doppler shifted center frequency and combining the frequency compensated scanning signal stream with a frequency compensated serving signal stream from the serving base station, and wherein the combining includes combining a scanning signal enhanced aggregated signal in which the scanning signal stream has been enhanced with a serving signal enhanced aggregated signal in which the serving signal stream has been enhanced. A8. The method of A1, wherein the enhancing includes frequency compensating the downlink scanning signal stream using a scanning base station Doppler shift parameter value that specifies an amount of a Doppler shift defined by the Doppler shifted center frequency and combining the frequency compensated scanning signal stream with a frequency compensated serving signal stream from the serving base station, and wherein the combining includes combining a scanning signal enhanced aggregated signal in which the scanning signal stream has been enhanced with a serving signal enhanced aggregated signal in which the serving signal stream has been enhanced, wherein the method includes applying scanning signal enhancing beam forming weights to a set of antennas for enhancement of the scanning signal stream within the scanning signal enhanced aggregated signal, wherein the method includes applying serving signal enhancing beam forming weights to the set of antennas for enhancement of the serving signal stream within the serving signal enhanced aggregated signal. A9. The method of A1, wherein the enhancing includes frequency compensating the downlink scanning signal stream using a scanning base station Doppler shift parameter value that specifies an amount of a Doppler shift defined by the Doppler shifted center frequency and combining the frequency compensated scanning signal stream with a frequency compensated serving signal stream from the serving base station, and wherein the combining includes combining a scanning signal enhanced aggregated signal in which the scanning signal stream has been enhanced with a serving signal enhanced aggregated signal in which the serving signal stream has been enhanced, wherein enhancement of the scanning signal stream within the scanning signal enhanced aggregated signal has included use of a first set of one or more directional antenna having a first mounting orientation, wherein enhancement of the serving signal stream within the serving signal enhanced aggregated signal has included use of a second set of one or more directional antenna having a second mounting orientation. A10. The method of A1, wherein the enhancing includes providing a tracking local oscillator signal for optimized down conversion of the scanning signal stream, the tracking local oscillator signal for down conversion of scanning signal stream dynamically tracking changes in the Doppler shifted center frequency of the scanning signal stream. A11. The method of A1, wherein the enhancing includes providing a tracking local oscillator signal for optimized down conversion of the scanning signal stream while maintaining a tracking local oscillator signal optimized for down conversion of a downlink serving signal stream, the tracking local oscillator signal for down conversion of scanning signal stream dynamically tracking changes in the Doppler shifted center frequency of the scanning signal stream, the tracking local oscillator signal for down conversion of the serving signal stream dynamically tracking changes in a center frequency of the serving signal stream. A12. The method of A1, wherein the enhancing includes applying beam forming weights to a set of antennas connected to the transceiver, the antennas of the set of antennas respectively picking up aggregated signals from multiple base stations. B1. A system comprising: a signal processing circuit, wherein the signal processing circuit is configured for performing: receiving, by a transceiver of a UE device an aggregate signal stream, the aggregate signal stream including an aggregate of base station downlink signal streams from a plurality of base stations; processing the aggregate signal stream and detecting, from the processing of the aggregate signal stream, a set of base stations in communication range of the UE device, wherein the set of base stations include a current serving base station and a scanning base station; determining, from the processing of the aggregate signal stream, a Doppler shifted center frequency of a downlink scanning signal stream received from the scanning base station; and enhancing, in dependence on the Doppler shifted center frequency, the downlink scanning signal stream associated to the scanning base station. C1. A method comprising: receiving by a transceiver of a UE device an aggregate signal stream, the aggregate signal stream including an aggregate of base station downlink signal streams from a plurality of base stations; processing the aggregate signal stream and detecting, from the processing of the aggregate signal stream, a set of base stations in communication range of the UE device; and enhancing a downlink scanning signal stream associated to a scanning base station in dependence on the detecting indicating that the scanning base station is included in the set of base stations in communication range of the UE device. C2. The method of C1, wherein the method includes, from iterative performance of the processing, storing into a data repository historical parameter values for the set of base stations in connection range of the UE device, wherein the method includes examining values of the historical parameter values and performing the enhancing the downlink scanning signal stream associated to a scanning base station in dependence on the examining. C3. The method of C1, wherein the method includes performing the enhancing the downlink scanning signal stream associated to a scanning base station in dependence on a determined signal strength of the scanning signal stream satisfying a threshold. C4. The method of C1, wherein the enhancing the downlink scanning signal stream associated to a scanning base station includes applying beam forming weights to a set of antennas connected to the transceiver responsively to a channel estimation associated to the scanning base station, the antennas of the set of antennas respectively picking up aggregated signals from multiple base stations. C5. The method of C1, wherein the method includes, with iterative performance of the processing, storing into a data repository historical Doppler shift parameter values for the set of base stations in connection range of the UE device, wherein method includes examining values of the Doppler shift historical parameter values and performing the enhancing the downlink scanning signal stream associated to a scanning base station in dependence on the examining. D1. A system comprising: a signal processing circuit, wherein the signal processing circuit is configured for: receiving by a transceiver of a UE device an aggregate signal stream, the aggregate signal stream including an aggregate of base station downlink signal streams from a plurality of base stations; processing the aggregate signal stream and detecting, from the processing of the aggregate signal stream, a set of base stations in communication range of the UE device; and enhancing a downlink scanning signal stream associated to a scanning base station in dependence on the detecting indicating that the scanning base station is included in the set of base stations in communication range of the UE device. E1. A method comprising: receiving, by a transceiver of a UE device an aggregate signal stream, the aggregate signal stream including an aggregate of base station downlink signal streams from a plurality of base stations; processing the aggregate signal stream and detecting, from the processing of the aggregate signal stream, identifiers for a set of base stations in communication range of the UE device, and Doppler shift parameter values that specify Doppler shifts associated to respective base stations of the set of base stations, wherein the set of base stations include a current serving base station and a plurality of scanning base stations; storing into a data repository the identifiers for the set of base stations in communication range of the UE device, and associated to the identifiers for the set of base stations the Doppler shift parameter values that specify Doppler shifts associated to respective base stations of the set of base stations; monitoring an uplink signal stream transmitted by the transceiver; and in response to the monitoring the uplink signal stream extracting an identifier of a certain base station, and applying frequency compensation to the uplink signal stream with use of a Doppler shift parameter value stored in the data repository and associated to the certain base station. F1. A system comprising: a signal processing circuit, wherein the signal processing circuit is configured for: receiving, by a transceiver of a UE device an aggregate signal stream, the aggregate signal stream including an aggregate of base station downlink signal streams from a plurality of base stations; processing the aggregate signal stream and detecting, from the processing of the aggregate signal stream, identifiers for a set of base stations in communication range of the UE device, and Doppler shift parameter values that specify Doppler shifts associated to respective base stations of the set of base stations, wherein the set of base stations include a current serving base station and a plurality of scanning base stations; storing into a data repository the identifiers for the set of base stations in communication range of the UE device, and associated to the identifiers for the set of base stations the Doppler shift parameter values that specify Doppler shifts associated to respective base stations of the set of base stations; monitoring an uplink signal stream transmitted by the transceiver; and in response to the monitoring the uplink signal stream extracting an identifier of a certain base station, and applying frequency compensation to the uplink signal stream with use of a Doppler shift parameter value stored in the data repository and associated to the certain base station. G1. A method comprising: receiving, by a transceiver of a UE device, an aggregate signal stream, the aggregate signal stream including an aggregate of base station downlink signal streams from a plurality of base stations; processing the aggregate signal stream and detecting, from the processing of the aggregate signal stream, identifiers for a set of base stations in communication range of the UE device, and Doppler shift parameter values that specify Doppler shifts associated to respective base stations of the set of base stations, wherein the set of base stations include a current serving base station and one or more scanning base station; storing into a data repository the identifiers for the set of base stations in communication range of the UE device, and Doppler shift parameter values that specify Doppler shifts associated to respective base stations of the set of base stations so that there are recorded within the data repository Doppler shift datasets, the Doppler shift datasets associating to identifiers for respective base stations of the set of base stations Doppler shift parameter values; and transmitting by the transceiver of a UE device, an uplink signal stream to a certain scanning base station of the one or more scanning base station that has been selected as a serving base station, wherein selection of the certain scanning base station as a serving base station has included an examination of data of the Doppler shift datasets. G2. The method of G1, wherein the method includes examining, by the UE device, data of the Doppler shift datasets. G3. The method of G1, wherein the method includes sending, by the UE device, data of the Doppler shift datasets to a ground based computing system, and receiving from the ground based computing system information indicating that the certain scanning base station has been selected as the serving base station. G4. The method of G1, wherein the method includes examining, by the UE device, data of the Doppler shift time series datasets, and sending, by the UE device, based on the examining a request to select the certain scanning base station as the serving base station. G5. The method of G1, repetitively performing the processing and the storing so that there are recorded within the data repository Doppler shift time series datasets, the time series datasets associating to identifiers for respective base stations of the set of base stations Doppler shift parameter values over time, wherein selection of the certain scanning base station as a serving base station has included an examination of data of the Doppler shift time series datasets. H1. A system comprising: a signal processing circuit, wherein the signal processing circuit is configured for: receiving, by a transceiver of a UE device, an aggregate signal stream, the aggregate signal stream including an aggregate of base station downlink signal streams from a plurality of base stations; processing the aggregate signal stream and detecting, from the processing of the aggregate signal stream, identifiers for a set of base stations in communication range of the UE device, and Doppler shift parameter values that specify Doppler shifts associated to respective base stations of the set of base stations, wherein the set of base stations include a current serving base station and one or more scanning base station; storing into a data repository the identifiers for the set of base stations in communication range of the UE device, and Doppler shift parameter values that specify Doppler shifts associated to respective base stations of the set of base stations so that there are recorded within the data repository Doppler shift datasets, the Doppler shift datasets associating to identifiers for respective base stations of the set of base stations Doppler shift parameter values; and transmitting by the transceiver of a UE device, an uplink signal stream to a certain scanning base station of the one or more scanning base station that has been selected as a serving base station, wherein selection of the certain scanning base station as a serving base station has included an examination of data of the Doppler shift datasets. I1. A method comprising: receiving, by a transceiver of a UE device, an aggregate signal stream, the aggregate signal stream including an aggregate of base station downlink signal streams from a plurality of base stations; processing the aggregate signal stream and detecting, from the processing of the aggregate signal stream, identifiers for a set of base stations in communication range of the UE device, and signal strength parameter values that specify signal strength associated to respective base stations of the set of base stations, wherein the set of base stations include a current serving base station and one or more scanning base station; storing into a data repository the identifiers for the set of base stations in communication range of the UE device, and signal strength parameter values that specify signal strength associated to respective base stations of the set of base stations so that there are recorded within the data repository signal strength datasets, the signal strength datasets associating to identifiers for respective base stations of the set of base stations signal strength parameter values; repetitively performing the processing and the storing so that there are recorded within the data repository signal strength time series datasets, the signal strength time series datasets associating to identifiers for respective base stations of the set of base stations signal strength parameter values over time; transmitting, by the transceiver of a UE device, an uplink signal stream to a certain scanning base station of the one or more scanning base station that has been selected as a serving base station, wherein selection of the certain scanning base station as a serving base station has included an examination of data of the signal strength time series datasets. I2. The method of I1, wherein the method includes determining Doppler shift parameter values using data of the signal strength time series datasets, wherein selection of the certain scanning base station as a serving base station has included an examination of data of the Doppler shift parameter values determined using data of the signal strength time series datasets. I3. The method of I1, wherein the method includes querying a predictive model for return of a predicted signal strength parameter value specifying a predicted signal strength of the certain scanning base station at a subsequent time, wherein the predictive model uses data of the signal strength time series datasets, and wherein the selection of the certain scanning base station as a serving base station has included an examination of the predicted signal strength parameter value. I4. The method of I1, wherein the method includes examining, by the UE device, data of the signal strength time series datasets, and sending, by the UE device, based on the examining a request to select the certain scanning base station as the serving base station. J1. A system comprising: a signal processing circuit, wherein the signal processing circuit is configured for: receiving, by a transceiver of a UE device, an aggregate signal stream, the aggregate signal stream including an aggregate of base station downlink signal streams from a plurality of base stations; processing the aggregate signal stream and detecting, from the processing of the aggregate signal stream, identifiers for a set of base stations in communication range of the UE device, and signal strength parameter values that specify signal strength associated to respective base stations of the set of base stations, wherein the set of base stations include a current serving base station and one or more scanning base station; storing into a data repository the identifiers for the set of base stations in communication range of the UE device, and signal strength parameter values that specify signal strength associated to respective base stations of the set of base stations so that there are recorded within the data repository signal strength datasets, the signal strength datasets associating to identifiers for respective base stations of the set of base stations signal strength parameter values; repetitively performing the processing and the storing so that there are recorded within the data repository signal strength time series datasets, the signal strength time series datasets associating to identifiers for respective base stations of the set of base stations signal strength parameter values over time; transmitting, by the transceiver of a UE device, an uplink signal stream to a certain scanning base station of the one or more scanning base station that has been selected as a serving base station, wherein selection of the certain scanning base station as a serving base station has included an examination of data of the signal strength time series datasets.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, they are by no means limiting and are merely exemplary. Any description herein of a particular value without a modifier implicitly encompasses that value modified by the term "about". Further, any description a specific range of values implicitly encompasses a description of all possible particular subranges of the specific range. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112(f) unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure may include only some of the described examples. Also, while some examples are described as having a certain number of elements it will be understood that the subject matter can be practiced with less than or greater than the certain number of elements. Accordingly, the subject matter is not to be seen as limited by the foregoing description, but is only limited by the scope of the appended claims.

The invention claimed is:

1. A method comprising:
    receiving, by a transceiver of a UE device an aggregate signal stream, the aggregate signal stream including an aggregate of base station downlink signal streams from a plurality of base stations;
    processing the aggregate signal stream and detecting, from the processing of the aggregate signal stream, a set of base stations in communication range of the UE device, wherein the set of base stations include a current serving base station and a scanning base station;
    determining, from the processing of the aggregate signal stream, a Doppler shifted center frequency of a downlink scanning signal stream received from the scanning base station; and
    enhancing, in dependence on the Doppler shifted center frequency, the downlink scanning signal stream associated to the scanning base station.

2. The method of claim 1, wherein the enhancing includes frequency compensating the downlink scanning signal stream using a scanning base station Doppler shift parameter value that specifies an amount of a Doppler shift defined by the Doppler shifted center frequency.

3. The method of claim 2, wherein the method includes combining the frequency compensated scanning signal stream with a frequency compensated serving signal stream from the serving base station, wherein the combining includes weighting the scanning signal stream and combining the weighted and frequency compensated scanning signal stream from the scanning base station with a weighted and frequency compensated serving signal stream from the serving base station.

4. The method of claim 2, method includes combining the frequency compensated scanning signal stream with a frequency compensated serving signal stream from the serving base station, and wherein the method includes presenting the combined signal to a down converter of the transceiver that includes a down conversion local oscillator signal matched to a network reference center frequency.

5. The method of claim 2, wherein the method includes combining the frequency compensated scanning signal stream with a frequency compensated serving signal stream from the serving base station, and wherein the combining includes combining a scanning signal enhanced aggregated signal in which the scanning signal stream has been enhanced with a serving signal enhanced aggregated signal in which the serving signal stream has been enhanced.

6. The method of claim 2, wherein the method includes combining the frequency compensated scanning signal stream with a frequency compensated serving signal stream from the serving base station, and wherein the combining includes combining a scanning signal enhanced aggregated signal in which the scanning signal stream has been enhanced with a serving signal enhanced aggregated signal in which the serving signal stream has been enhanced, wherein the method includes applying scanning signal enhancing beam forming weights to a set of antennas for enhancement of the scanning signal stream within the scanning signal enhanced aggregated signal, wherein the method includes applying serving signal enhancing beam forming weights to the set of antennas for enhancement of the serving signal stream within the serving signal enhanced aggregated signal.

7. The method of claim 2, wherein the method includes detecting an amount of a Doppler shift defined by the Doppler shifted center frequency, wherein the enhancing includes frequency compensating the downlink scanning signal stream in dependence on the detected amount of Doppler shift defined by the Doppler shifted center frequency.

8. The method of claim 1, wherein the enhancing includes frequency compensating the downlink scanning signal stream in dependence on an amount of a Doppler shift defined by the Doppler shifted center frequency and combining the frequency compensated scanning signal stream with a serving signal stream from the serving base station.

9. The method of claim 8, wherein the method includes presenting the combined signal to a down converter of the transceiver.

10. The method of claim 1, wherein the enhancing includes providing a tracking local oscillator signal for optimized down conversion of the scanning signal stream, the tracking local oscillator signal for down conversion of scanning signal stream dynamically tracking changes in the Doppler shifted center frequency of the scanning signal stream.

11. The method of claim 10, the tracking local oscillator signal for down conversion of a serving signal stream dynamically tracking changes in a center frequency of the serving signal stream.

12. The method of claim 1, wherein the enhancing includes providing a tracking local oscillator signal for optimized down conversion of the scanning signal stream, the tracking local oscillator signal for down conversion of scanning signal stream dynamically tracking changes in the Doppler shifted center frequency of the scanning signal stream.

13. A method comprising:
receiving by a transceiver of a UE device an aggregate signal stream, the aggregate signal stream including an aggregate of base station downlink signal streams from a plurality of base stations;
processing the aggregate signal stream and detecting, from the processing of the aggregate signal stream, a set of base stations in communication range of the UE device; and
enhancing a downlink scanning signal stream associated to a scanning base station in dependence on the detecting indicating that the scanning base station is included in the set of base stations in communication range of the UE device, wherein the enhancing the downlink scanning signal stream associated to a scanning base station includes applying beam forming weights to a set of antennas connected to the transceiver responsively to a channel estimation associated to the scanning base station, the antennas of the set of antennas respectively picking up aggregated signals from multiple base stations.

14. A method comprising:
receiving by a transceiver of a UE device an aggregate signal stream, the aggregate signal stream including an aggregate of base station downlink signal streams from a plurality of base stations;
processing the aggregate signal stream and detecting, from the processing of the aggregate signal stream, a set of base stations in communication range of the UE device; and
enhancing a downlink scanning signal stream associated to a scanning base station in dependence on the detecting indicating that the scanning base station is included in the set of base stations in communication range of the UE device, wherein the method includes, from iterative performance of the processing, storing into a data repository historical parameter values for the set of base stations in connection range of the UE device, wherein the method includes examining values of the historical parameter values and performing the enhancing the downlink scanning signal stream associated to a scanning base station in dependence on the examining.

15. A method comprising:
receiving by a transceiver of a UE device an aggregate signal stream, the aggregate signal stream including an aggregate of base station downlink signal streams from a plurality of base stations;
processing the aggregate signal stream and detecting, from the processing of the aggregate signal stream, a set of base stations in communication range of the UE device; and
enhancing a downlink scanning signal stream associated to a scanning base station in dependence on the detecting indicating that the scanning base station is included in the set of base stations in communication range of the UE device, wherein the method includes performing the enhancing the downlink scanning signal stream associated to a scanning base station in dependence on a determined signal strength of the scanning signal stream satisfying a threshold.

16. A method comprising:
receiving by a transceiver of a UE device an aggregate signal stream, the aggregate signal stream including an aggregate of base station downlink signal streams from a plurality of base stations;
processing the aggregate signal stream and detecting, from the processing of the aggregate signal stream, a set of base stations in communication range of the UE device; and
enhancing a downlink scanning signal stream associated to a scanning base station in dependence on the detecting indicating that the scanning base station is included in the set of base stations in communication range of the UE device, wherein the enhancing includes frequency compensating the downlink scanning signal stream in dependence on an amount of a Doppler shift of the downlink scanning signal stream and combining the frequency compensated scanning signal stream with a serving signal stream from a serving base station.

17. The method of claim 16, wherein the method includes combining the frequency compensated scanning signal stream with a serving signal stream from the serving base station, and wherein the serving signal stream from the serving base station is a frequency compensated serving signal stream from the serving base station.

18. The method of claim 17, wherein the set of base stations include the current serving base station, the scanning base station and a second scanning base station, wherein the combining the frequency compensated scanning signal stream with a serving signal stream from the serving base station includes further combining the frequency compensated scanning signal stream with a second base station signal stream from the second scanning base station.

19. The method of claim 17, wherein the method includes presenting the combined signal to a down converter of the transceiver.

20. The method of claim 16, wherein the method includes presenting the combined signal to a down converter of the transceiver.

* * * * *